United States Patent
Hansen et al.

(10) Patent No.: US 6,666,556 B2
(45) Date of Patent: Dec. 23, 2003

(54) IMAGE PROJECTION SYSTEM WITH A POLARIZING BEAM SPLITTER

(75) Inventors: Douglas P. Hansen, Spanish Fork, UT (US); Raymond T. Perkins, Orem, UT (US); Eric Gardner, Eagle Mountain, UT (US)

(73) Assignee: Moxtek, Inc, Orem, UT (US)

( * ) Notice: Subject to any disclaimer, the term of this patent is extended or adjusted under 35 U.S.C. 154(b) by 0 days.

(21) Appl. No.: 10/238,996

(22) Filed: Sep. 9, 2002

(65) Prior Publication Data

US 2003/0071973 A1 Apr. 17, 2003

Related U.S. Application Data

(63) Continuation-in-part of application No. 09/862,183, filed on May 21, 2001, now Pat. No. 6,447,120, which is a continuation-in-part of application No. 09/363,256, filed on Jul. 28, 1999, now Pat. No. 6,234,634.

(51) Int. Cl.[7] .............................................. G03B 21/14
(52) U.S. Cl. .......................................... 353/20; 353/31
(58) Field of Search ............................... 353/20, 31, 33, 353/34, 37, 81; 349/5, 8, 9; 359/486

(56) References Cited

U.S. PATENT DOCUMENTS

| | | |
|---|---|---|
| 2,224,214 A | 12/1940 | Brown |
| 2,287,598 A | 6/1942 | Brown |
| 2,403,731 A | 7/1946 | MacNeille |
| 2,748,659 A | 6/1956 | Geffcken et al. |
| 2,887,566 A | 5/1959 | Marks |
| 3,046,839 A | 7/1962 | Bird et al. |
| 3,436,143 A | 4/1969 | Garrett |
| 3,479,168 A | 11/1969 | Bird et al. |
| 3,536,373 A | 10/1970 | Bird et al. |
| 3,566,099 A | 2/1971 | Makas |
| 3,627,431 A | 12/1971 | Komarniski |
| 3,631,288 A | 12/1971 | Rogers |
| 3,731,986 A | 5/1973 | Fergason |
| 3,857,627 A | 12/1974 | Harsch |
| 3,857,628 A | 12/1974 | Strong |
| 3,876,285 A | 4/1975 | Schwarzmüller |

(List continued on next page.)

FOREIGN PATENT DOCUMENTS

| | | |
|---|---|---|
| DE | 416157 | 7/1925 |
| DE | 296391 | 2/1950 |
| DE | 3707984 A1 | 3/1987 |

(List continued on next page.)

OTHER PUBLICATIONS

Lloyd William Taylor Manual of Advanced Undergraduate Experiments in Physics, p. 302 (1959).

(List continued on next page.)

*Primary Examiner*—William Dowling
(74) *Attorney, Agent, or Firm*—Thorpe North & Western

(57) ABSTRACT

An image projection system includes one or more wire grid polarizing beam splitters and one or more transmissive arrays. A polarized light beams from a light source and pre-polarizer is directed towards the transmissive array which modulates the polarization of the polarized light beam by selectively altering the polarization of the polarized light beam to encode image information thereon and creating a modulated beam. The modulated beam is directed towards the wire grid polarizing beam splitter which acts as an analyzer to separate the modulated beam into reflected and transmitted beams. A screen is disposed in one of the reflected or transmitted beams to display the encoded image information. The polarizing beam splitter is oriented at an angle with respect to the modulated beam such that the reflected beam is directed away from the transmissive array. A plurality of transmissive arrays can be used for different colors. One or more polarizing beam splitters can act as both analyzers and combiners.

29 Claims, 13 Drawing Sheets

U.S. PATENT DOCUMENTS

| | | |
|---|---|---|
| 3,912,369 A | 10/1975 | Kashnow |
| 3,969,545 A | 7/1976 | Slocum |
| 4,009,933 A | 3/1977 | Firester |
| 4,025,164 A | 5/1977 | Doriguzzi et al. |
| 4,025,688 A | 5/1977 | Nagy et al. |
| 4,049,944 A | 9/1977 | Garvin et al. |
| 4,073,571 A | 2/1978 | Grinberg et al. |
| 4,104,598 A | 8/1978 | Abrams |
| 4,181,756 A | 1/1980 | Fergason |
| 4,220,705 A | 9/1980 | Sugibuchi et al. |
| 4,221,464 A | 9/1980 | Pedinoff et al. |
| 4,268,127 A | 5/1981 | Oshima et al. |
| 4,289,381 A | 9/1981 | Garvin et al. |
| 4,294,119 A | 10/1981 | Soldner |
| 4,456,515 A | 6/1984 | Krueger et al. |
| 4,466,704 A | 8/1984 | Schuler et al. |
| 4,492,432 A | 1/1985 | Kaufmann et al. |
| 4,512,638 A | 4/1985 | Sriram et al. |
| 4,514,479 A | 4/1985 | Ferrante |
| 4,515,441 A | 5/1985 | Wentz |
| 4,560,599 A | 12/1985 | Regan |
| 4,679,910 A | 7/1987 | Efron et al. |
| 4,688,897 A | 8/1987 | Grinberg et al. |
| 4,711,530 A | 12/1987 | Nakanowatari et al. |
| 4,743,092 A | 5/1988 | Pistor |
| 4,743,093 A | 5/1988 | Oinen |
| 4,759,611 A | 7/1988 | Downey, Jr. |
| 4,759,612 A | 7/1988 | Nakatsuka et al. |
| 4,799,776 A | 1/1989 | Yamazaki et al. |
| 4,818,076 A | 4/1989 | Heppke et al. |
| 4,840,757 A | 6/1989 | Blenkhorn |
| 4,865,670 A | 9/1989 | Marks |
| 4,895,769 A | 1/1990 | Land et al. |
| 4,913,529 A | 4/1990 | Goldenberg et al. |
| 4,946,231 A | 8/1990 | Pistor |
| 4,966,438 A | 10/1990 | Mouchart et al. |
| 4,991,937 A | 2/1991 | Urino |
| 5,029,988 A | 7/1991 | Urino |
| 5,061,050 A | 10/1991 | Ogura |
| 5,087,985 A | 2/1992 | Kitaura et al. |
| 5,113,285 A | 5/1992 | Franklin et al. |
| 5,122,887 A | 6/1992 | Mathewson |
| 5,122,907 A | 6/1992 | Slocum |
| 5,139,340 A | 8/1992 | Okumura |
| 5,157,526 A | 10/1992 | Kondo et al. |
| 5,177,635 A | 1/1993 | Keilmann |
| 5,204,765 A | 4/1993 | Mitsui et al. |
| 5,216,539 A | 6/1993 | Boher et al. |
| 5,225,920 A | 7/1993 | Kasazumi et al. |
| 5,235,443 A | 8/1993 | Barnik et al. |
| 5,235,449 A | 8/1993 | Imazeki et al. |
| 5,239,322 A | 8/1993 | Takanashi et al. |
| 5,245,471 A | 9/1993 | Iwatsuka et al. |
| 5,279,689 A | 1/1994 | Shvartsman |
| 5,295,009 A | 3/1994 | Barnik et al. |
| 5,305,143 A | 4/1994 | Taga et al. |
| 5,325,218 A | 6/1994 | Willett et al. |
| 5,333,072 A | 7/1994 | Willett |
| 5,349,192 A | 9/1994 | Mackay |
| 5,357,370 A | 10/1994 | Miyatake et al. |
| 5,383,053 A | 1/1995 | Hegg et al. |
| 5,422,756 A | 6/1995 | Weber |
| 5,436,761 A | 7/1995 | Kamon |
| 5,466,319 A | 11/1995 | Zager et al. |
| 5,485,499 A | 1/1996 | Pew et al. |
| 5,486,935 A | 1/1996 | Kalmanash |
| 5,486,949 A | 1/1996 | Schrenk et al. |
| 5,490,003 A | 2/1996 | Van Sprang |
| 5,506,704 A | 4/1996 | Broer et al. |
| 5,508,830 A | 4/1996 | Imoto et al. |
| 5,513,023 A | 4/1996 | Fritz et al. |
| 5,513,035 A | 4/1996 | Miyatake et al. |
| 5,517,356 A | 5/1996 | Araujo et al. |
| 5,557,343 A | 9/1996 | Yamagishi |
| 5,559,634 A | 9/1996 | Weber |
| 5,570,215 A | 10/1996 | Omae et al. |
| 5,574,580 A | 11/1996 | Ansley |
| 5,579,138 A | 11/1996 | Sannohe et al. |
| 5,594,561 A | 1/1997 | Blanchard |
| 5,609,939 A | 3/1997 | Petersen et al. |
| 5,612,820 A | 3/1997 | Schrenk et al. |
| 5,619,356 A | 4/1997 | Kozo et al. |
| 5,626,408 A | 5/1997 | Heynderickx et al. |
| 5,658,060 A | 8/1997 | Dove |
| 5,686,979 A | 11/1997 | Weber et al. |
| 5,748,368 A | 5/1998 | Tamada et al. |
| 5,748,369 A | 5/1998 | Yokota |
| 5,798,819 A | 8/1998 | Hattori et al. |
| 5,826,960 A | 10/1998 | Gotoh et al. |
| 5,833,360 A | 11/1998 | Knox et al. |
| 5,838,403 A | 11/1998 | Jannson et al. |
| 5,841,494 A | 11/1998 | Hall |
| 5,986,730 A | 11/1999 | Hansen et al. |
| 6,081,376 A | 6/2000 | Hansen et al. |
| 6,082,861 A | 7/2000 | Dove et al. |
| 6,108,131 A | 8/2000 | Hansen et al. |
| 6,122,103 A | 9/2000 | Perkins et al. |
| 6,234,634 B1 | 5/2001 | Hansen et al. |
| 6,250,762 B1 * | 6/2001 | Kuijper ........................ 353/20 |
| 6,340,230 B1 * | 1/2002 | Bryars et al. .................. 353/31 |
| 6,520,645 B2 * | 2/2003 | Yamamoto et al. ........... 353/31 |

FOREIGN PATENT DOCUMENTS

| | | |
|---|---|---|
| EP | 0317910 A1 | 11/1987 |
| EP | 0349144 B1 | 6/1988 |
| EP | 0349309 B1 | 6/1988 |
| EP | 0336334 B1 | 8/1988 |
| EP | 0357946 B1 | 8/1988 |
| EP | 407830 B1 | 7/1989 |
| EP | 0407830 A2 | 7/1989 |
| EP | 416157 A1 | 9/1989 |
| EP | 0488544 A1 | 11/1990 |
| EP | 0507445 A2 | 3/1991 |
| EP | 0518111 A1 | 5/1991 |
| EP | 0588937 B1 | 6/1991 |
| EP | 0521591 B1 | 7/1991 |
| EP | 0543061 A1 | 11/1991 |
| EP | 0606940 A2 | 1/1993 |
| EP | 0634674 A2 | 6/1993 |
| EP | 0670506 A1 | 9/1993 |
| EP | 0744634 A2 | 5/1995 |
| JP | 0084502 | 8/1989 |
| SU | 1781659 A1 | 10/1990 |

OTHER PUBLICATIONS

Flanders, Application of ≈ 100 Å linewidth structures fabricated by shadowing techniques[a], J. Vac. Sci. Technol., 19(4), Nov./Dec. 1981.

Kuta and van Driel, "Coupled–wave analysis of lamellar metal transmission gratings for the visible and the infrared," J. Opt. Soc. Am. A/vol. 12, No. 5/May 1995.

Lockbihler and Depine, "Diffraction from highly conducting wire gratings of arbitrary cross–section," Jornal of Modern Optics, 1993, vol. 40, No. 7, pp. 1273–1298.

Novak et al., "Far infrared polarizing grids for use at cryogenic temperatures," Applied Optics, Aug. 15, 1989/vol. 28, No. 15, pp. 3425–3427.

Auton and Hutley, "Grid Polarizers for Use in the Near Infrared," Infrared Physics, 1972, vol. 12, pp. 95–100.

Stenkamp et al, "Grid polarizer for the visible spectral region," SPIE vol. 2213 pp. 288–296.

Handbook of Optics, 1978, pp. 10–68–10–77.

Handbook of Optics vol. II, $2^{nd}$ Edition, pp. 3.32–3.35.

Glytsis and Gaylord, "High–spatial–frequency binary and multilevel stairstep gratings: polarization–selective mirrors and broadband antireflection surfaces," Applied Optics Aug. 1, 1992 vol. 31, No. 22 pp. 4459–4470.

Auton, "Infrared Transmission Polarizers by Photolithography," Applied Optics Jun. 1967 vol. 6, No. 6, pp. 1023–1027.

Haggans et al., "Lamellar gratings as polarization components for specularly reflected beams," Journal of Modern Optics, 1993, vol. 40, No. 4, pp. 675–686.

Nordin et al., "Micropolarizer array for infrared polarimetry", J. Op. Soc. Am. A. vol. 16 No. 5/May 1999.

Bird and Parrish, Jr., "The Wire Grid as a Near–Infrared Polarizer," J. Op. Soc. Am. vol. 50 No. 9 (1960).

Optics $9^{th}$ Edition, pp. 338–339 (1980).

Whitbourn and Douglas, "Phase shifts in transmission line models of thin periodic metal grids," Applied Optics Aug. 15, 1989 vol. 28, No. 15, pp. 3511–3515.

Enger and Case, "Optical elements with ultrahigh spatial-frequency surface corrugations," Applied Optics Oct. 15, 1983, vol. 22, No. 20 pp. 3220–3228.

Knop, "Reflection Grating Polarizer for the Infrared," Optics Communications vol. 26, No. 3, Sep. 1978.

Hass and O'Hara, "Sheet Infrared Transmission Polarizers," Applied Optics Aug. 1965, vol. 4, No. 8 pp. 1027–1031.

Flanders, "Submicron periodicity gratins as artifical anisotropic dielectrics," Appl. Phys. Lett, 42 (6), Mar. 15, 1983, pp. 492–494.

Li Li and J.A. Dobrowski, "Visible broadband, wide–angle, thin–film multilayer polarizing beam splitter," Applied Optics May 1, 1996, vol. 35, No. 13, pp. 2221–2224.

Sonek et al., "Ultraviolet grating polarizers," J. Vac. Sci. Technol., 19(4), Nov./Dec. 1981, pp. 921–923.

N.M. Ceglio, Invited Review "Revolution in X–Ray Optics", J. X–Ray Science & Tech. 1, 7–78 (1989).

Dainty, et al, "Measurements of light scattering by characterized random rough surface", Waves in Random Media 3 (1991).

DeSanto & Wombell, "Rough surgace scattering", Waves in Random Media 1 (1991).

Lavin, "Specular Reflection", Monographs on App. Opt. No. 2.

Maystre & Dainty, Modern Analysis of Scattering Phenomena Proceeding from International Workshop held at Domaine deTournon, Aix en Provence, France Sep. 5–8, 1990.

* cited by examiner

IMAGE PROJECTION SYSTEM WITH A POLARIZING BEAM SPLITTER

This application is a continuation-in-part of Ser. No. 09/862,183 now U.S. Pat. No. 6,447,120, issued Sep. 10, 2002, and filed May 21, 2001, which is a continuation-in-part of Ser. No. 09/363,256 U.S. Pat. No. 6,234,634, issued May 22, 2001, and filed Jul. 28, 1999.

BACKGROUND OF THE INVENTION

1. Field of the Invention

The present invention relates generally to an image projection system operable within the visible spectrum that includes a polarizing beam splitter that reflects one linear polarization of light and transmits the other. More particularly, the present invention relates to such an image projection system with a compact, light-weight beam splitter that is comprised of a plurality of elongated, reflective elements for interacting with the electromagnetic waves of the source light to generally transmit or pass one polarization of light, and reflect the other polarization.

2. Related Art

Polarized light is necessary in certain applications, such as projection liquid crystal displays (LCD). Such a display is typically comprised of a light source; optical elements, such as lenses to gather and focus the light; a polarizer that transmits one polarization of the light to the liquid crystal array; a liquid crystal array for manipulating the polarization of the light to encode image information thereon; means for addressing each pixel of the array to either change or retain the polarization; a second polarizer (called an analyzer) to reject the unwanted light from the selected pixels; and a screen upon which the image is focused.

It is possible to use a single polarizing beam splitter (PBS) to serve both as the first polarizer and the second polarizer (analyzer). If the liquid crystal array is reflective, for example a Liquid Crystal On Silicon (LCOS) light valve, it can reflect the beam that comes from the polarizer directly back to the polarizer after encoding the image by modifying the polarization of selected pixels. Such a system was envisioned by Takanashi (U.S. Pat. No. 5,239,322). The concept was elaborated by Fritz and Gold (U.S. Pat. No. 5,513,023). These similar approaches would provide important advantages in optical layout and performance. Neither, however, has been realized in practice because of deficiencies in conventional polarizing beam splitters. The disadvantages of using conventional polarizing beam splitters in projection liquid crystal displays includes images that are not bright, have poor contrast, and have non-uniform color balance or non-uniform intensity (due to non-uniform performance over the light cone). In addition, many conventional polarizing beam splitters are short-lived because of excessive heating, and are very expensive.

In order for such an image projection system to be commercially successful, it must deliver images which are significantly better than the images provided by conventional cathode ray tube (CRT) television displays because it is likely that such a system will be more expensive than conventional CRT technology. Therefore, the image projection system must provide (1) bright images with the appropriate colors or color balance; (2) have good image contrast; and (3) be as inexpensive as possible. An improved polarizing beam splitter (PBS) is an important part of achieving this goal because the PBS is a limiting component which determines the potential performance of the display system.

The PBS characteristics which significantly affect the display performance are (1) the angular aperture, or the f-number, at which the polarizer can function; (2) the absorption, or energy losses, associated with the use of the PBS; and (3) the durability of the PBS. In optics, the angular aperture or f-number describes the angle of the light cone which the PBS can use and maintain the desired performance level. Larger cones, or smaller f-numbers, are desired because the larger cones allow for more light to be gathered from the light source, which leads to greater energy efficiency and more compact systems.

The absorption and energy losses associated with the use of the PBS obviously affect the brightness of the system since the more light lost in the optics, the less light remains which can be projected to the view screen. In addition, the amount of light energy which is absorbed by the polarizer will affect its durability, especially in such image projection systems in which the light passing through the optical system is very intense, on the order of watts per square centimeter. Light this intense can easily damage common polarizers, such as Polaroid sheets. In fact, the issue of durability limits the polarizers which can be used in these applications.

Durability is also important because the smaller and lighter the projection system can be made, the less expensive and more desirable is the product. To accomplish this goal, however, the light intensity must be raised even higher, further stressing the PBS, and shortening its useful life.

A problematic disadvantage of conventional PBS devices is poor conversion efficiency, which is the primary critical performance factor in displays. Conversion efficiency is a measure describing how much of the electrical power required by the light source is translated into light intensity power on the screen or panel that is observed by people viewing it. It is expressed as the ratio of total light power on the screen divided by the electrical power required by the light source. The conventional units are lumens per watt. A high ratio is desirable for a number of reasons. For example, a low conversion efficiency will require a brighter light source, with its accompanying larger power supply, excess heat, larger enclosures and cabinet, etc. In addition, all of these consequences of low conversion efficiency raise the cost of the projection system.

A fundamental cause of low conversion efficiency is poor optical efficiency, which is directly related to the f-number of the optical system. A system which has an f-number which is half the f-number of an otherwise equivalent system has the potential to be four times as efficient in gathering light from the light source. Therefore, it is desirable to provide an improved polarizing beam splitter (PBS) which allows more efficient harvesting of light energy by offering a significantly smaller potential f-number (larger angular aperture), and therefore increases the conversion efficiency, as measured in lumens/watt.

There are several reasons for the poor performance of conventional polarizing beam splitters with respect to conversion efficiency when they are used as beam splitters in projection systems. First, current beam splitters work poorly if the light does not strike them at a certain angle (or at least, within a narrow cone of angles about this principal angle of incidence). Deviation of the principal ray from this angle causes each type of polarizing beam splitter to degrade the intensity, the purity of polarization, and/or the color balance. This applies to the beam coming from the light source as well as to the beam reflected from the liquid crystal array. This principal angle depends upon the design and construction of the PBS as well as the physics of the polarization mechanism employed in these various beam splitters. Currently available polarizing beam splitters are not capable of operating efficiently at angles far from their principal polarizing angles in the visible portion of the electromagnetic spectrum. This restriction makes it impossible to implement certain promising optical layouts and commercially promising display designs.

Even if the principal ray strikes the polarizer at the best angle for separating the two polarizations, the other rays cannot diverge far from this angle or their visual qualities will be degraded. This is a serious deficiency in a display apparatus because the light striking the polarizer must be strongly convergent or divergent to make efficient use of the light emitted by typical light sources. This is usually expressed as the f-number of the optical system. For a single lens, the f-number is the ratio of the aperture to the focal length. For optical elements in general, the F-number is defined as $$F/\# = 1/(2n \sin \theta)$$

where n is the refractive index of the space within which the optical element is located, and θ is the half cone angle. The smaller the F-number, the greater the radiant flux, $\Phi_c$, collected by the lens, and the more efficient the device will be for displaying a bright image. The radiant flux increases as the inverse square of the F/#. In an optical train, the optical element with the largest F/# will be the limiting factor in its optical efficiency. For displays using traditional polarizers, the limiting element is nearly always the polarizer, and thus the PBS limits the conversion efficiency. It would clearly be beneficial to develop a type of PBS that has a smaller F/# than any that are currently available.

Because traditional polarizers with small F/#s have not been available, designers typically have addressed the issue of conversion efficiency by specifying a smaller, brighter light source. Such sources, typically arc lamps, are available, but they require expensive power supplies that are heavy, bulky, and need constant cooling while in operation. Cooling fans cause unwanted noise and vibration. These features are detrimental to the utility of projectors and similar displays. Again, a PBS with a small F/# would enable efficient gathering of light from low-power, quiet, conventional light sources.

Another key disadvantage of conventional polarizing beam splitters is a low extinction, which results in poor contrast in the image. Extinction is the ratio of the light transmitted through the polarizer of the desired polarization to the light rejected of the undesired polarization. In an efficient display, this ratio must be maintained at a minimum value over the entire cone of light passing through the PBS. Therefore, it is desirable to provide a polarizing beam splitter which has a high extinction ratio resulting in a high contrast image.

A third disadvantage of conventional polarizing beam splitters is a non-uniform response over the visible spectrum, or poor color fidelity. The result is poor color balance which leads to further inefficiency in the projection display system as some light from the bright colors must be thrown away to accommodate the weaknesses in the polarizing beam splitter. Therefore, it is desirable to provide an improved polarizing beam splitter that has a uniform response over the visible spectrum, (or good color fidelity) giving an image with good color balance with better efficiency. The beam splitter must be achromatic rather than distort the projected color, and it must not allow crosstalk between the polarizations because this degrades image acuity and contrast. These characteristics must apply over all portions of the polarizer and over all angles of light incidence occurring at the polarizer. The term spathic has been coined (R. C. Jones, Jour. Optical Soc. Amer. 39, 1058, 1949) to describe a polarizer that conserves cross-sectional area, solid angle, and the relative intensity distribution of wavelengths in the polarized beam. A PBS that serves as both a polarizer and analyzer must be spathic for both transmission and reflection, even in light beams of large angular aperture.

A fourth disadvantage of conventional polarizing beam splitters is poor durability. Many conventional polarizing beam splitters are subject to deterioration caused by excessive heating and photochemical reactions. Therefore, it is desirable to provide an improved polarizing beam splitter that can withstand an intense photon flux for thousands of hours without showing signs of deterioration. In addition, it is desirable to provide a polarizing beam splitter that is amenable to economical large scale fabrication.

The need to meet these, and other, criteria has resulted in only a few types of polarizers finding actual use in a projection system. Many attempts have been made to incorporate both wide angular aperture and high fidelity polarization into the same beam splitting device. The relative success of these efforts is described below. Thin film interference filters are the type of polarizer cited most frequently in efforts to make a polarizing beam splitter that is also used as an analyzer. MacNeille was the first to describe such a polarizer that was effective over a wide spectral range (U.S. Pat. No. 2,403,731). It is composed of thin-film multi-layers set diagonally to the incident light, typically within a glass cube, so it is bulky and heavy compared to a sheet polarizer. What is more, it must be designed for a single angle of incidence, usually 45 degrees, and its performance is poor if light is incident at angles different from this by even as little as 2 degrees. Others have improved on the design (e.g. J. Mouchart, J. Begel, and E. Duda, Applied Optics 28, 2847–2853, 1989; and L. Li and J. A. Dobrowolski, Applied Optics 13, 2221–2225, 1996). All of them found it necessary to seriously reduce the wavelength range if the angular aperture is to be increased. This can be done in certain designs (U.S. Pat. Nos. 5,658,060 and 5,798,819) in which the optical design divides the light into appropriate color bands before it arrives at the polarizing beam splitter. In this way, it is possible to reduce the spectral bandwidth demands on the beam splitter and expand its angular aperture, but the additional components and complexity add significant cost, bulk, and weight to the system.

Even so, these improved beam splitter cubes are appearing on the market, and are currently available from well known vendors such as Balzers and OCLI. They typically offer an F/# of f/2.5–f/2.8, which is a significant improvement over what was available 2 years ago, but is still far from the range of F/1.2–F/2.0 which is certainly within reach of the other key components in optical projection systems. Reaching these f-numbers has the potential to improve system efficiency by as much as a factor of 4. They would also enable the projection display engineer to make previously impossible design trade-offs to achieve other goals, such as reduced physical size and weight, lower cost, etc.

In a technology far from visible optics, namely radar, wire grids have been used successfully to polarize long wavelength radar waves. These wire grid polarizers have also been used as reflectors. They are also well known as optical components in the infrared (IR), where they are used principally as transmissive polarizer elements.

Although it has not been demonstrated, some have postulated possible use of a wire grid polarizer in display applications in the visible portion of the spectrum. For example, Grinberg (U.S. Pat. No. 4,688,897) suggested that a wire grid polarizer serve as both a reflector and an electrode (but not simultaneously as an analyzer) for a liquid crystal display.

Others have posed the possible use of a wire grid polarizer in place of a dichroic polarizer to improve the efficiency of virtual image displays (see U.S. Pat. No. 5,383,053). The need for contrast or extinction in the grid polarizer, however, is explicitly dismissed, and the grid is basically used as a polarization sensitive beam steering device. It does not serve the purpose of either an analyzer, or a polarizer, in the U.S. Pat. No. 5,383,053. It is also clear from the text that a broadband polarizing cube beam splitter would have served the purpose as well, if one had been available. This technology, however, is dismissed as being too restricted in acceptance angle to even be functional, as well as prohibitively expensive.

Another patent (U.S. Pat. No. 4,679,910) describes the use of a grid polarizer in an imaging system designed for the testing of IR cameras and other IR instruments. In this case, the application requires a beam splitter for the long wavelength infra-red, in which case a grid polarizer is the only practical solution. The patent does not suggest utility for the visible range or even mention the need for a large angular aperture. Neither does it address the need for efficient conversion of light into a viewable image, nor the need for broadband performance.

Other patents also exist for wire-grid polarizers in the infrared portion of the spectrum (U.S. Pat. Nos. 4,514,479, 4,743,093; and 5,177,635, for example). Except for the exceptions just cited, the emphasis is solely on the transmission performance of the polarizer in the IR spectrum.

These references demonstrate that it has been known for many years that wire-grid arrays can function generally as polarizers. Nevertheless, they apparently have not been proposed and developed for image projection systems. One possible reason that wire grid polarizers have not been applied in the visible spectrum is the difficulty of manufacture. U.S. Pat. No. 4,514,479 teaches a method of holographic exposure of photoresist and subsequent etching in an ion mill to make a wire grid polarizer for the near infrared region; in U.S. Pat. No. 5,122,907, small, elongated ellipsoids of metal are embedded in a transparent matrix that is subsequently stretched to align their long axes of the metal ellipsoids to some degree. Although the transmitted beam is polarized, the device does not reflect well. Furthermore, the ellipsoid particles have not been made small enough to be useful in the visible part of the electromagnetic spectrum. Accordingly, practical applications have been generally limited to the longer wavelengths of the IR spectrum.

Another prior art polarizer achieves much finer lines by grazing angle evaporative deposition (U.S. Pat. No. 4,456, 515). Unfortunately, the lines have such small cross sections that the interaction with the visible light is weak, and so the optical efficiency is too poor for use in the production of images. As in several of these prior art efforts, this device has wires with shapes and spacings that are largely random. Such randomness degrades performance because regions of closely spaced elements do not transmit well, and regions of widely spaced elements have poor reflectance. The resulting degree of polarization (extinction) is less than maximal if either or both of these effects occur, as they surely must if placement has some randomness to it.

For perfect (and near perfect) regularity, the mathematics developed for gratings apply well. Conversely, for random wires (even if they all have the same orientation) the theory of scattering provides the best description. Scattering from a single cylindrical wire has been described (H. C. Van de Hulst, Light Scattering by Small Particles, Dover, 1981). The current random-wire grids have wires embedded throughout the substrate. Not only are the positions of the wires somewhat random, but the diameters are as well. It is clear that the phases of the scattered rays will be random, so the reflection will not be strictly specular and the transmission will not retain high spatial or image fidelity. Such degradation of the light beam would prevent its use for transfer of well resolved, high-information density images.

Nothing in the prior art indicates or suggests that an ordered array of wires can or should be made to operate over the entire visible range as a spathic PBS, at least at the angles required when it serves both as a polarizer and analyzer. Indeed, the difficulty of making the narrow, tall, evenly spaced wires that are required for such operation has been generously noted (see Zeitner, et. al. Applied Optics, 38, 11 pp. 2177–2181 (1999), and Schnabel, et. al., Optical Engineering 38,2 pp. 220–226 (1999)). Therefore, it is not surprising that the prior art for image projection similarly makes no suggestion for use of a spathic PBS as part of a display device.

Tamada and Matsumoto (U.S. Pat. No. 5,748,368) disclose a wire grid polarizer that operates in both the infrared and a portion of the visible spectrum; however, it is based on the concept that large, widely spaced wires will create resonance and polarization at an unexpectedly long wavelength in the visible. Unfortunately, this device works well only over a narrow band of visible wavelengths, and not over the entire visible spectrum. It is therefore not suitable for use in producing images in full color. Accordingly, such a device is not practical for image display because a polarizer must be substantially achromatic for an image projection system.

Another reason wire grid polarizers have been overlooked is the common and long standing belief that the performance of a typical wire grid polarizer becomes degraded as the light beam's angle of incidence becomes large (G. R. Bird and M. Parrish, Jr., A The Wire Grid as a Near-Infrared Polarizer, @J. Opt. Soc. Am., 50, pp. 886–891, (1960); the Handbook of Optics, Michael Bass, Volume II, p. 3–34, McGraw-Hill (1995)). There are no reports of designs that operate well for angles beyond 35 degrees incidence in the visible portion of the spectrum. Nor has anyone identified the important design factors that cause this limitation of incidence angle. This perceived design limitation becomes even greater when one realizes that a successful beam splitter will require suitable performance in both transmission and reflection simultaneously.

This important point deserves emphasis. The extant literature and patent history for wire grid polarizers in the IR and the visible spectra has almost entirely focused on their use as transmission polarizers, and not on reflective properties. Wire grid polarizers have been attempted and reported in the technical literature for decades, and have become increasingly common since the 1960s. Despite the extensive work done in this field, there is very little, if any, detailed discussion of the production and use of wire grid polarizers as reflective polarizers, and nothing in the literature concerning their use as both transmissive and reflective polarizers simultaneously, as would be necessary in a spathic polarizing beam splitter for use in imaging devices. From the lack of discussion in the literature, a reasonable investigator would conclude that any potential use of wire grid polarizers as broadband visible beam splitters is not apparent, or that it was commonly understood by the technical community that their use in such an application was not practical.

Because the conventional polarizers described above were the only ones available, it was impossible for Takanashi (U.S. Pat. No. 5,239,322) to reduce his projection device to practice with anything but the most meager results. No polarizer was available which supplied the performance required for the Takanashi invention, namely, achromaticity over the visible part of the spectrum, wide angular acceptance, low losses in transmission and reflection of the desired light polarizations, and good extinction ratio.

There are several important features of an image display system which require specialized performance of transmission and reflection properties. For a projector, the product of p-polarization transmission and s-polarization reflection ($R_S T_P$) must be large if source light is to be efficiently placed on the screen. On the other hand, for the resolution and contrast needed to achieve high information density on the screen, it is important that the converse product ($R_P T_S$) be very small (i.e. the transmission of s-polarized light multiplied by the reflection of p-polarized light must be small).

Another important feature is a wide acceptance angle. The acceptance angle must be large if light gathering from the source, and hence the conversion efficiency, is maximized. It is desirable that cones of light (either diverging or converging) with half-angles greater than 20 be accepted.

An important consequence of the ability to accept larger light cones and work well at large angles is that the optical design of the imaging system is no longer restricted. Conventional light sources can be then be used, bringing their advantages of low cost, cool operation, small size, and low weight. A wide range of angles makes it possible for the designer to position the other optical elements in favorable positions to improve the size and operation of the display.

Another important feature is size and weight. The conventional technology requires the use of a glass cube. This cube imposes certain requirements and penalties on the system. The requirements imposed include the need to deal with thermal loading of this large piece of glass and the need for high quality materials without stress birefringence, etc., which impose additional cost. In addition, the extra weight and bulk of the cube itself poses difficulties. Thus, it is desirable that the beam splitter not occupy much volume and does not weigh very much.

Another important feature is robustness. Modern light sources generate very high thermal gradients in the polarizer immediately after the light is switched on. At best, this can induce thermal birefringence which causes cross talk between polarizations. What is more, the long duration of exposure to intense light causes some materials to change properties (typically yellowing from photo-oxidation). Thus, it is desirable for the beam splitter to withstand high temperatures as well as long periods of intense radiation from light sources.

Still another important feature is uniform extinction (or contrast) performance of the beam splitter over the incident cone of light. A McNeille-type thin film stack polarizer produces polarized light due to the difference in reflectivity of S-polarized light as opposed to P-polarized light. Since the definition of S and P polarization depends on the plane of incidence of the light ray, which changes orientation within the cone of light incident on the polarizer, a McNeille-type polarizer does not work equally well over the entire cone. This weakness in McNeille-type polarizers is well known. It must be addressed in projection system design by restricting the angular size of the cone of light, and by compensation elsewhere in the optical system through the use of additional optical components. This fundamental weakness of McNeille prisms raises the costs and complexities of current projection systems, and limits system performance through restrictions on the f-number or optical efficiency of the beam splitter.

Other important features include ease of alignment. Production costs and maintenance are both directly affected by assembly criteria. These costs can be significantly reduced with components which do not require low tolerance alignments.

Therefore, it would be advantageous to develop an image projection system capable of providing bright images and good image contrast, and which is inexpensive. It would also be advantageous to develop an image projection system with a polarizing beam splitter capable of utilizing divergent light (or having a smaller F/#), capable of efficient use of light energy or with high conversion efficiency, and which is durable. It would also be advantageous to develop an image projection system with a polarizing beam splitter having a high extinction ratio, uniform response over the visible spectrum, good color fidelity, that is spathic, robust and capable of resisting thermal gradients. It would also be advantageous to develop an image projection system with a polarizing beam splitter capable of being positioned at substantially any incidence angle so that significant design constraints are not imposed on the image projection system, but substantial design flexibility is permitted. It would also be advantageous to develop an image projection system with a polarizing beam splitter which efficiently transmits p-polarized light and reflects s-polarized light across all angles in the entire cone of incident light. It would also be advantageous to develop an image projection system with a polarizing beam splitter which is light-weight and compact. It would also be advantageous to develop an image projection system with a polarizing beam splitter which is easy to align. Combining all of these features in a single projection device would offer a significant advance within the state of the art.

SUMMARY OF THE INVENTION

It has been recognized that it would be advantageous to develop an image projection system which provides bright images with good image contrast, and which is inexpensive. In addition, it has been recognized that it would be advantageous to develop an image projection system with a polarizing beam splitter which utilizes divergent light (or has a smaller F/#), efficiently uses light energy, has good conversion efficiency, and is durable. It also has been recognized that it would be advantageous to develop an image projection system with a polarizing beam splitter with a high extinction ratio, a uniform response over the visible spectrum, good color fidelity, which is spathic, robust and resists thermal gradients. In addition, it has been recognized that it would be advantageous to develop an image projection system with a polarizing beam splitter capable of selectively directing either or both of the transmitted and reflected polarized beams at substantially any angle. It also has been recognized that it would be advantageous to develop an image projection system with a polarizing beam splitter which functions adequately while positioned at substantially any incident angle. In addition, it has been recognized that it would be advantageous to develop an image projection system with a polarizing beam splitter which efficiently transmits p-polarized light and reflects s-polarized light over all angles within the cone of light, but can also function to transmit s-polarized light and reflect p-polarized light similarly. It also has been recognized that it would be advantageous to develop an image projection system with a polarizing beam splitter which is light-weight, compact, robust, and easy to align. It is a further object of the present invention to provide a polarizing beam splitter for use in image projection systems.

The invention provides an image projection system with one or more wire grid polarizing beam splitters and one or more transmissive arrays. The system includes a light source to produce a visible light beam directed to a first polarizer to polarize the light beam into a polarized light beam. The polarized light beam is directed towards the transmissive array which modulates the polarization of the polarized light beam by selectively altering the polarization of the polarized light beam to encode image information thereon, thus creating a modulated beam. The modulated beam is directed towards the polarizing beam splitter.

The polarizing beam splitter includes a generally parallel arrangement of thin, elongated elements, supported by a transparent substrate. The arrangement is configured and the elements are sized to interact with electromagnetic waves of the modulated beam to generally 1) transmit light through the elements which has a polarization oriented perpendicular to a plane that includes at least one of the elements and the direction of the incident light beam, defining a transmitted beam, and 2) reflect light from the elements which has a polarization oriented parallel with the plane that includes at least one of the elements and the direction of the incident light beam, defining a reflected beam.

The polarizing beam splitter can be oriented at an angle with respect to the modulated beam such that the modulated beam strikes the first surface of the transparent substrate at an angle, and so that the reflected beam is directed away from the transmissive array. Either the reflected or transmitted beam is directed towards a screen for displaying the encoded image information.

In accordance with a more detailed aspect of the present invention, the system includes a plurality of transmissive arrays for different colors, and one or more polarizing beam splitters acting as both analyzers and combiners. For example, three transmissive arrays can be used for three separate colors. A bandwidth separator can separate the visible light beam into a plurality of colored beams each characterized by a different color with different bandwidths. The separator and one or more first polarizers together can produce a plurality of colored polarized beams. Each of the transmissive arrays modulate the polarization of the respective colored polarized beam by selectively altering the polarization of the colored polarized beam to encode image information thereon, and thus creating a colored modulated beam.

At least two polarizing beam splitters can be used as both analyzers and combiners. A first polarizing beam splitter is positioned in two different colored modulated beams to combine the two different colored modulated beams into a first combined beam. A second polarizing beam splitter is positioned in the first combined beam and the other colored modulated beam to combine the colored modulated beam from the another transmissive array and the first combined beam into a second combined beam.

In accordance with another more detailed aspect of the present invention, the first polarizer also can include a wire grid polarizer.

In accordance with another more detailed aspect of the present invention, the image projection system can be realized with at least one polarizing beam splitter in the case in which only two transmissive panels are used. In such case, one panel can produce a beam of light which consists of two colors in such a way as to project an image.

Additional features and advantages of the invention will be apparent from the detailed description which follows, taken in conjunction with the accompanying drawings, which together illustrate, by way of example, features of the invention.

DETAILED DESCRIPTION

Figure 1A:
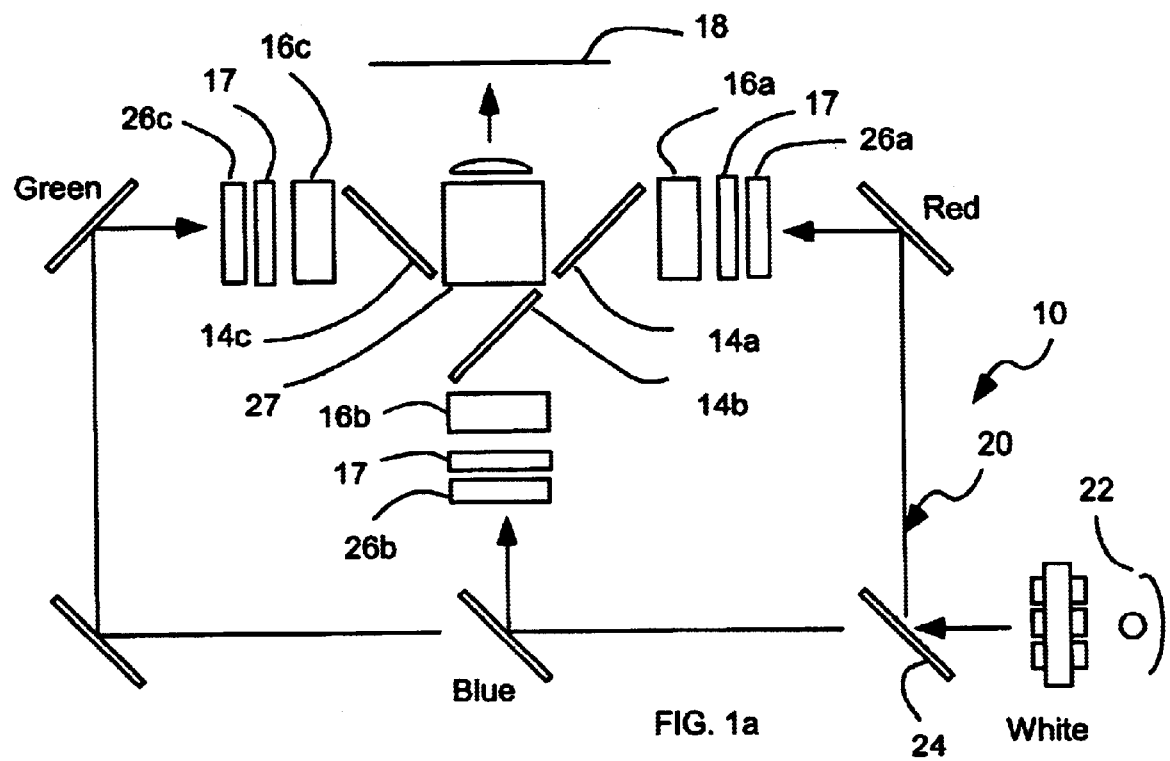
FIG. 1a is a schematic view of an image projection system in accordance with an embodiment of the present invention.
Figure 1B:
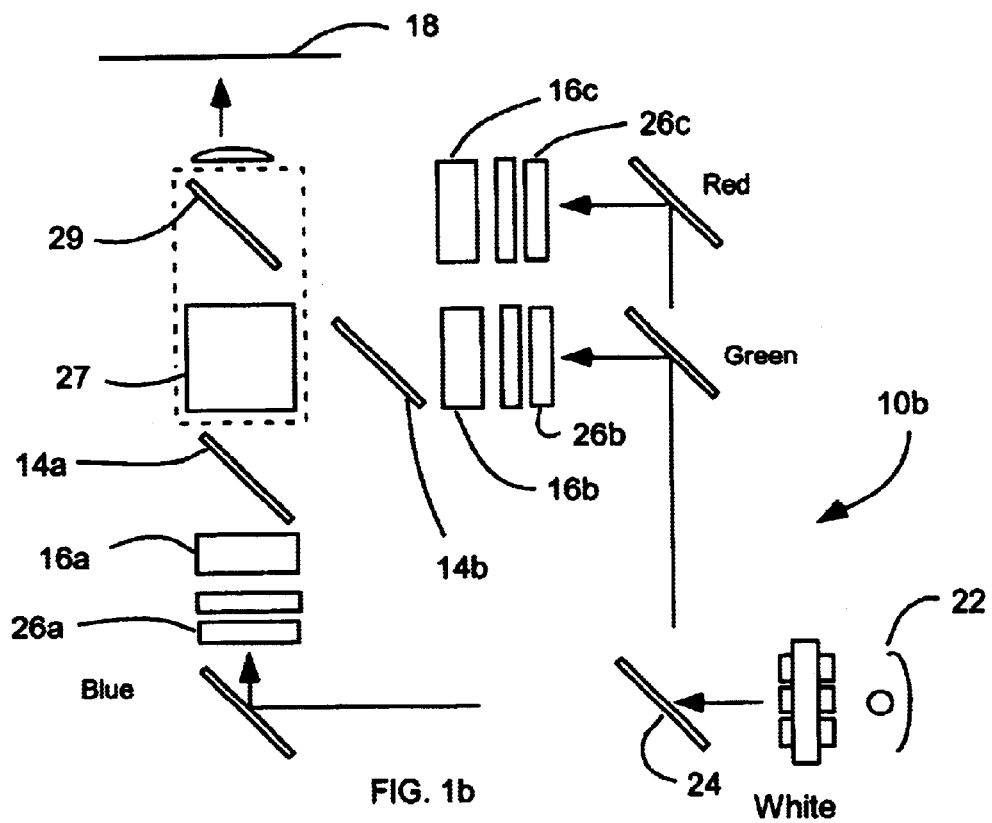
FIG. 1b is a schematic view of another image projection system in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIG. 1a, a display optical train of an image projection system of the present invention, indicated generally at 10, is shown. The image projection system 10 advantageously has one or more wire grid polarizers as a beam splitter, indicated at 14a–c, and one or more transmissive arrays, 16a–c. While image projection systems with reflective arrays have been described in the inventor's prior patents, the present image projection system is configured to utilize transmissive arrays. The wire grid polarizing beam splitter 14 (WGP-PBS) acts as an analyzer to efficiently reflect or transmit light of one polarization from the transmissive array 16 to a display screen 18. The WPG-PBS 14 also can advantageously be used as both the analyzer and the image combiner, as discussed more fully below.

As shown in FIG. 1a, a plurality of WGP-PBSs and a plurality of transmissive arrays can be used in the system 10, and can each correspond to a different color. For example, three WGP-PBSs 14a–c and three transmissive arrays 16a–c can be used, and can correspond to three separate and different colors, such as blue, green and red. A separator, indicated generally at 20, can be used to separate a visible light beam of white light from a visible light source 22 into the desired colors. Such separators are well known in the art, and can include dichroic mirrors 24 disposed in the visible light beam and arranged to separate the white light into colored light beams, each with a different wavelength or bandwidth. It will be appreciated that other optical components can be used, as known in the art.

In addition, one or more pre-polarizers or first polarizers 26a–c can be disposed in the colored light beams to polarize the colored light beams to colored polarized light beams. Alternatively, it will be appreciated that the pre-polarizer or first polarizer can be disposed in the visible light beam to produce a polarized light beam, while the separator can be disposed in the polarized light beam to separate to separating the polarized light beam into the colored polarized light beams. Either way, the separator 20 and the first polarizers 26a–c together produce the colored polarized light beams. The visible light beam can be separated into various colored light beams first, and then polarized, as shown, or the visible light beam can be polarized first, and then separated into various colored light beams. The pre-polarizers or first polarizers 26a–c can be any type of polarizer. In one aspect, the pre-polarizers or first polarizers 26a–c can include WGP-PBS, as discussed more fully below.

The transmissive arrays 16a–c are located in the colored polarized beams. The transmissive arrays can be transmissive liquid crystal arrays, as are well known in the art. For example, the transmissive arrays can include a liquid crystal layer sandwiched between two conductive layers. The transmissive arrays 16a–c modulate the polarization of the respective colored polarized beams by selectively altering the polarization of the colored polarized beam. Modulating or selectively altering the polarization of the beam encodes image information on the beam, and created a modulated, or colored modulated beam. For example, the transmissive arrays 16a–c can include a plurality of cells or pixels, each independently operable to selectively rotate, or unalter, the polarization of the light as it passes through the cell or pixel. The liquid crystal material in the transmissive arrays can normally rotate the polarization of the light passing through the cell or pixel unless an electric field is applied across the cell or pixel to alter the liquid crystal and to allow the light passing therethrough unaltered. Alternatively, the liquid crystal material in the tranxmissive arrays can normally unalter the polarization of the light passing through the cell or pixel unless an electric field is applied across the cell or pixel to alter the liquid crystal to rotate the polarization of the light passing therethrough. The electric field can be applied by the conductive layers on both sides of the liquid crystal material. A controller can be electrically coupled to the transmissive arrays to control the modulation of the light, as is known in the art.

As stated above, the WGP-PBSs 14a–c are disposed in the respective colored modulated beams, and act as analyzers to separate the encoded image information from the modulated beams. Each WGP-PBS separates the modulated beam into a transmitted beam with one polarization, and a reflected beam of another polarization. Thus, the image information encoded on the modulated beam is separated out from the modulated beam into either the reflected and/or the transmitted beam. The WGP-PBSs 14a–c can be oriented at an acute or obtuse angle (as opposed to a right angle) with respect to the respective modulated beam so that the modulated beam strikes the WGP-PBS at an acute or obtuse angle. Thus, the reflected beam from the WGP-PBS is directed away from the transmissive array. It will be appreciated that orienting the WGP-PBS at a right angle with respect to the modulated beam would result in the reflected beam being directed back into the transmissive array, potentially resulting in noise.

A combiner or an image combiner 27 can be disposed in the reflected and/or transmitted beams from the WGP-PBSs 14a–c to combine the image information from the various colored beam into a single image beam directed towards the screen 18. It will be appreciated that each reflected or transmitted beam from the WGP-PBS will include the desired image in the respective color. The combiner can be of any type, and is known in the art.

Figure 2A:
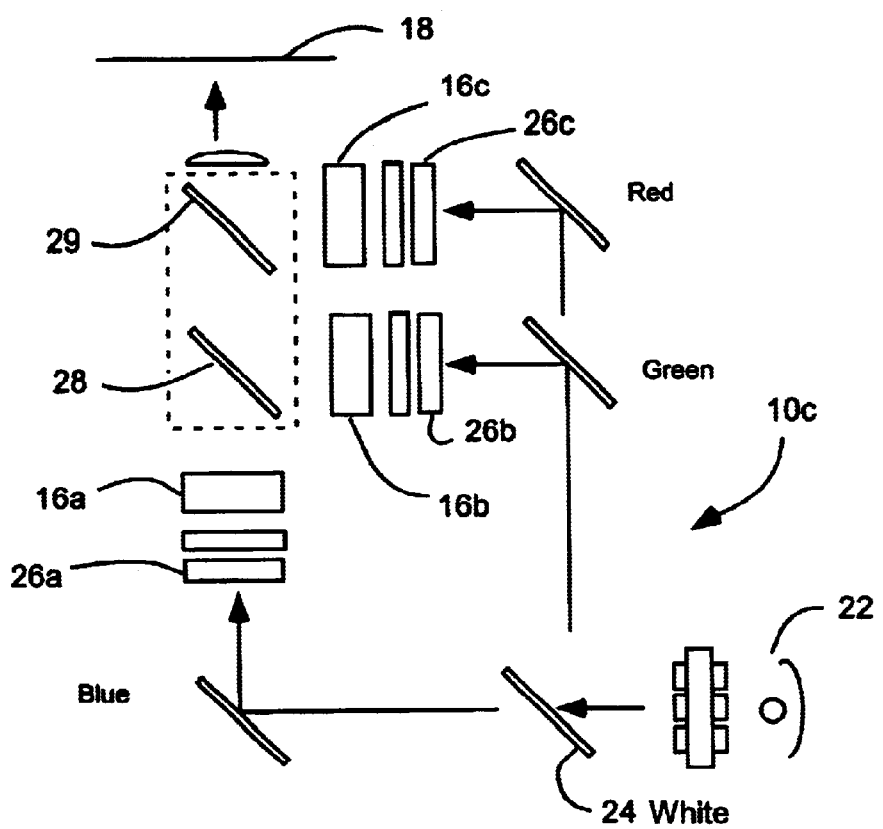
FIG. 2a is a schematic view of another image projection system in accordance with an embodiment of the present invention.
Figure 2B:
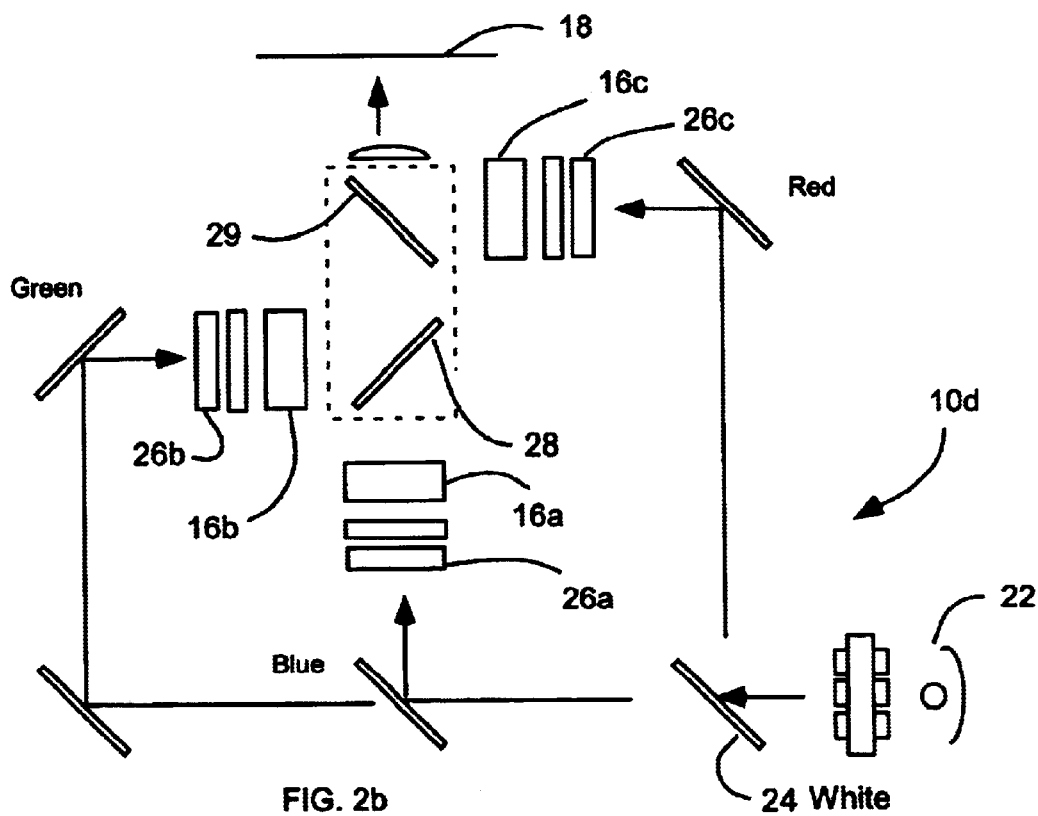
FIG. 2b is a schematic view of another image projection system in accordance with an embodiment of the present invention.

The optical train of the image projection system can be configured with both an image combiner, and a WGP-PBS. Referring to FIG. 2b, an exemplary image projection system 10b is shown configured with both a combiner 27 and a WGP-PBS 29. The WGP-PBS 29 is configured as both an analyzer and a combiner, or to both 1) separate the encoded image information, and 2) combine the various different colored beams. The image projection system 10b is similar in many respects to those described herein.

The combiner 27 can be disposed in the reflected and/or transmitted beams from the WGP-PBSs 14a and b to combine the image information from the various colored beams into a first combined beam. The polarizing beam splitter or WGP-PBS 29 can be disposed in the first combined beam from the combiner 27, and another colored modulated beam from another transmissive array 16c. The polarizing beam splitter or WGP-PBS 29 can both 1) separate the encoded image information from the other modulated beam, and 2) combing the reflected and/or transmitted beam from the other transmissive array with the first combined beam from the combiner 27 into a second combined beam with the desired image information for three of the colored beams. Alternatively, it will be appreciated that the positions of the combiner 27 and the WGP-PBS 29 can be switched.

The optical train of the image projection system can be configured with one or more of the WGP-PBSs 14a–c or analyzers also forming a combiner to combine two or more colored beams. Referring to FIG. 2a, an exemplary image projection system 10c is shown configured with the WGP-PBSs 14a–c configured as both analyzers and combiners, or to both 1) separate the encoded image information, and 2) combine the various different colored beams. The image projection system 10c is similar in many respects to those described herein, and can be configured for three different colors with three transmissive arrays 16a–c.

A first polarizing beam splitter or WGP-PBS 28 can be disposed in two colored modulated beams from two transmissive arrays 16a and b. The first polarizing beam splitter or WGP-PBS 28 can both 1) separate the encoded image information in both of the modulated beams (separating both modulated beams into reflected and transmitted beams as described above), and 2) combing the reflected beam from one of the modulated beams, with the transmitted beam of the other modulated beam, into a first combined beam with the desired image information for two of the colored beams. It will be noted that one of the modulated beams includes the desired image information in one polarization, while the other modulated beam includes the desired image information in another polarization, so that the desired image information can be combined into the first combined beam by the first polarizing beam splitter or WGP-PBS 28. For example, the desired image information from one modulated beam can be in a polarization that is transmitted by the WGP-PBS 28, while the desired image information from the other modulated beam can be in a polarization that is reflected by the WGP-PBS 28. For example, the WGP-PBS 28 can be disposed in the modulated beams from of the blue and green colors, and can combine the image information transmitted blue beam with the image information in the reflected green beam, as shown. The WGP-PBS 28 is oriented with respect to both modulated beams, or both transmissive arrays 16a and b, so that the desired reflected and transmitted beam align as the desired first combined beam.

It will be appreciated that the desired image information can be encoded on the modulated beams differently, or that the transmissive arrays can be configured differently. For example, a first transmissive array 16a can encode the information on the modulated beam to be transmitted by the WGP-PBS 28, while the second array 16b can encode the information on the modulated beam to be reflected by the WGP-PBS 28. Thus, the two modulated beams can have the image information encoded in opposite polarizations, or the two transmissive arrays can encode the image information in opposite polarizations.

A second polarizing beam splitter or WGP-PBS 29 can be disposed in the first combined beam from the first WGP-PBS 28, and another colored modulated beam from another transmissive array 16c. The second polarizing beam splitter or WGP-PBS 29 can both 1) separate the encoded image information from the other modulated beam, and 2) combing the reflected and/or transmitted beam from the other transmissive array with the first combined beam from the first WGP-PBS 28 into a second combined beam with the desired image information for three of the colored beams. For example, the second WGP-PBS 29 can combine the image information in the reflected red beam with the first combined beam (or reflected green beam and transmitted blue beam).

Therefore, two polarizing beam splitters or WGP-PBSs 28 and 29 can be used to analyze and combine three colored modulated beams. A single WGP-PBS can be used to analyze and combine two colored modulated beams. The beams can be combined such that one beam is reflected from the beam splitter in such a manner as to cause the reflected beam to be collinear and with the image information registered upon the other beam which is transmitted through the beam splitter, the combined beams forming a multicolor image beam.

As shown in FIG. 2a, the WGP-PBSs 28 and 29 can be oriented substantially parallel with one another. Such a configuration can allow the two WGP-PBSs 28 and 29 to be disposed closer together, and thus can reduce the size of the system 10c. Referring to FIG. 2b, the system 10d can be configured with the WGP-PBSs 28 and 29 oriented substantially orthogonal to one another. Such a configuration can allow better optical qualities of the WGP-PBSs 28 and 29 to be combined.

Figure 2C:
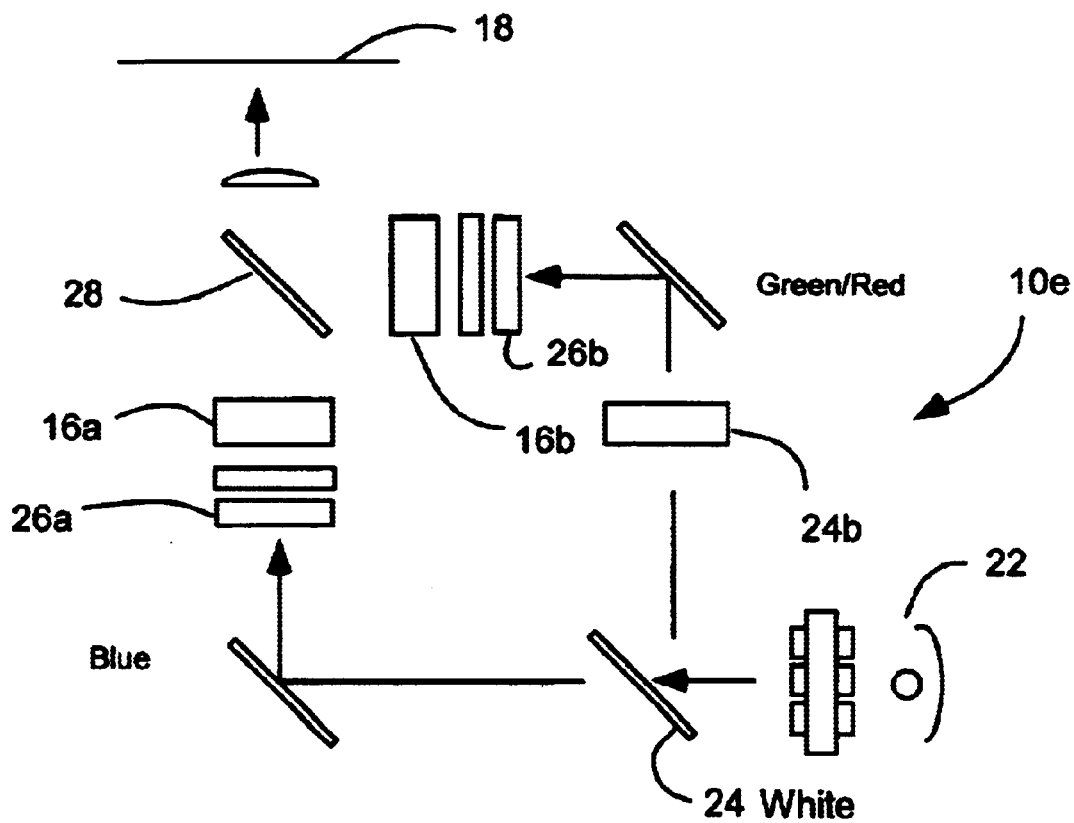
FIG. 2c is a schematic view of another image projection system in accordance with an embodiment of the present invention.

While the above systems have been described with respect to using three colored beams, it will be appreciated that the system can be configured to utilize more or less colored beams. In addition, the above systems have been described as using separate colored beams, or separate optical paths for each color. It will be appreciated that two or more color beams can share the same optical path. For example, referring to FIG. 2c, a system 10e is shown with two optical paths, and a single WGP-PBS 28 acting as booth the analyzer and the combiner. Two colors, for example green and red, can share an optical path, as shown. An alternator 24b can be used to alternate between colors in the optical path. For example, the alternator 24b can switch between the green and red color beams. The transmissive array 16b also can be controlled to alternate control between the different colors, and thus can selectively alter different colors. The switching of colored beams by the alternator 24b and transmissive array 16b can be rapid enough so as to be undetected by the unaided eye. The alternator 24b, or alternator means for altering between colors, can be a color wheel or the like.

As described above, the pre-polarizers 26a–c also can be wire grid polarizers. Referring to FIGS. 3a–b and 4a–c, image projection systems 10f–j are shown that are similar to those described above, but with wire grid polarizers 26d–f as the pre-polarizers. The wire grid polarizers 26d–f can be oriented at an acute or obtuse angle (as opposed to a right angle) with respect to the respective colored polarized beams so that the reflected beam is directed away from the light source or separator.

Figure 4C:
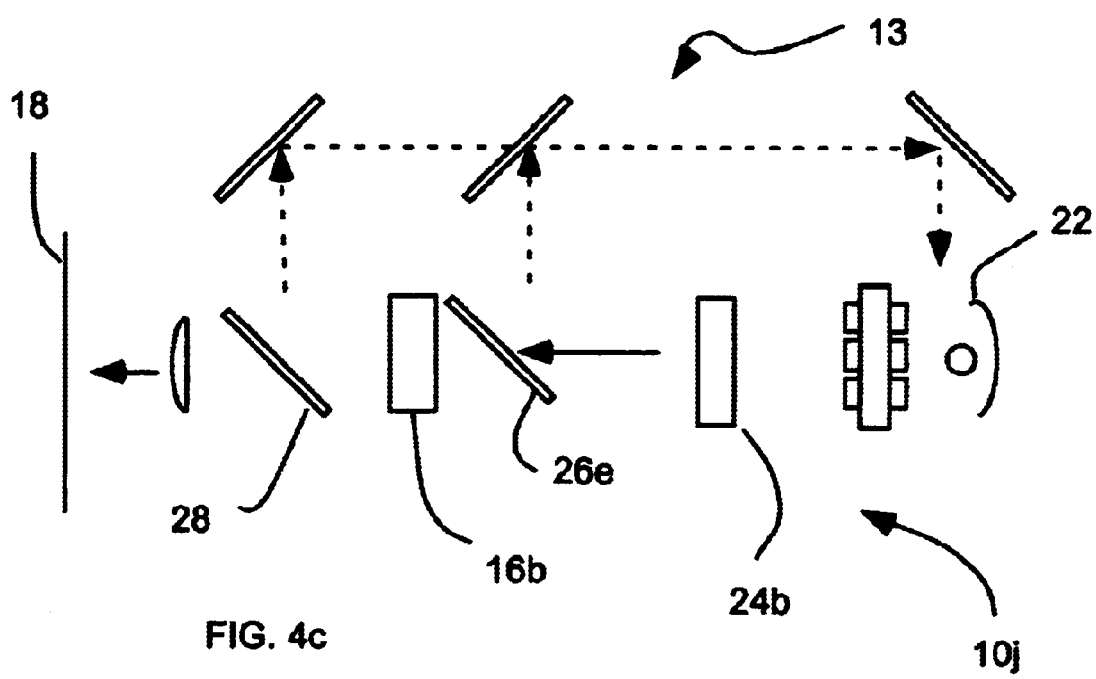
FIG. 4c is a schematic view of another image projection system in accordance with an embodiment of the present invention.
Figure 3A:
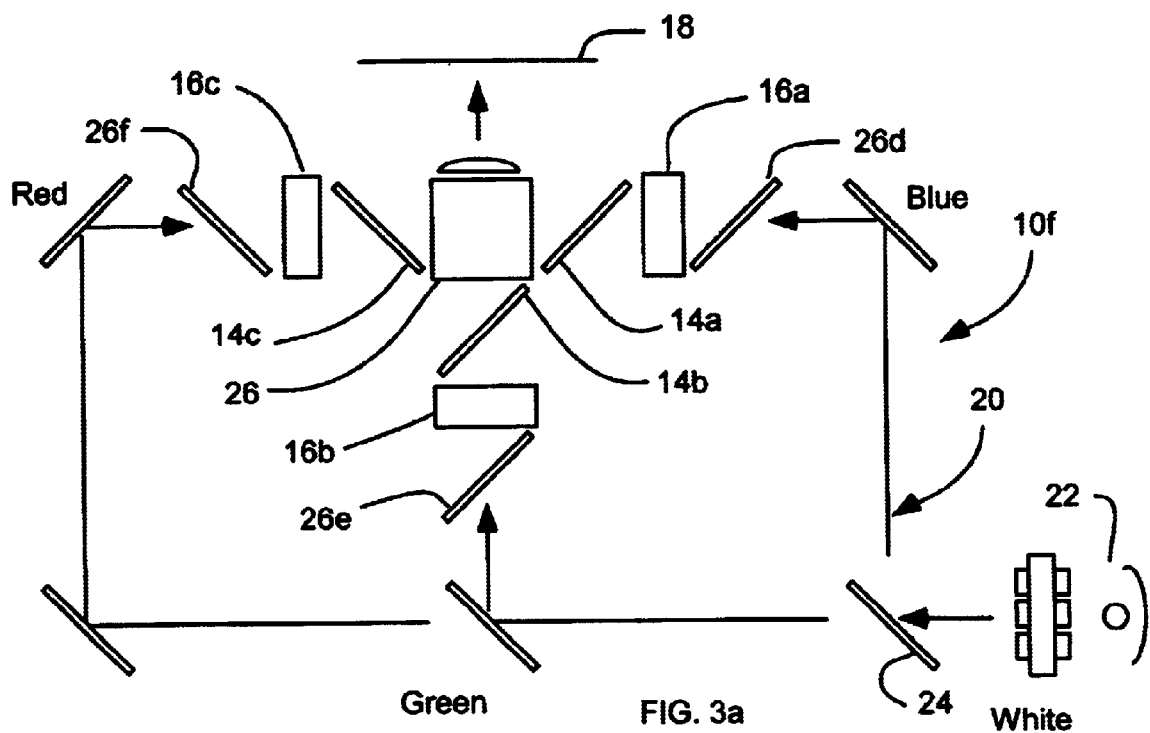
FIG. 3a is a schematic view of another image projection system in accordance with an embodiment of the present invention.
Figure 3B:
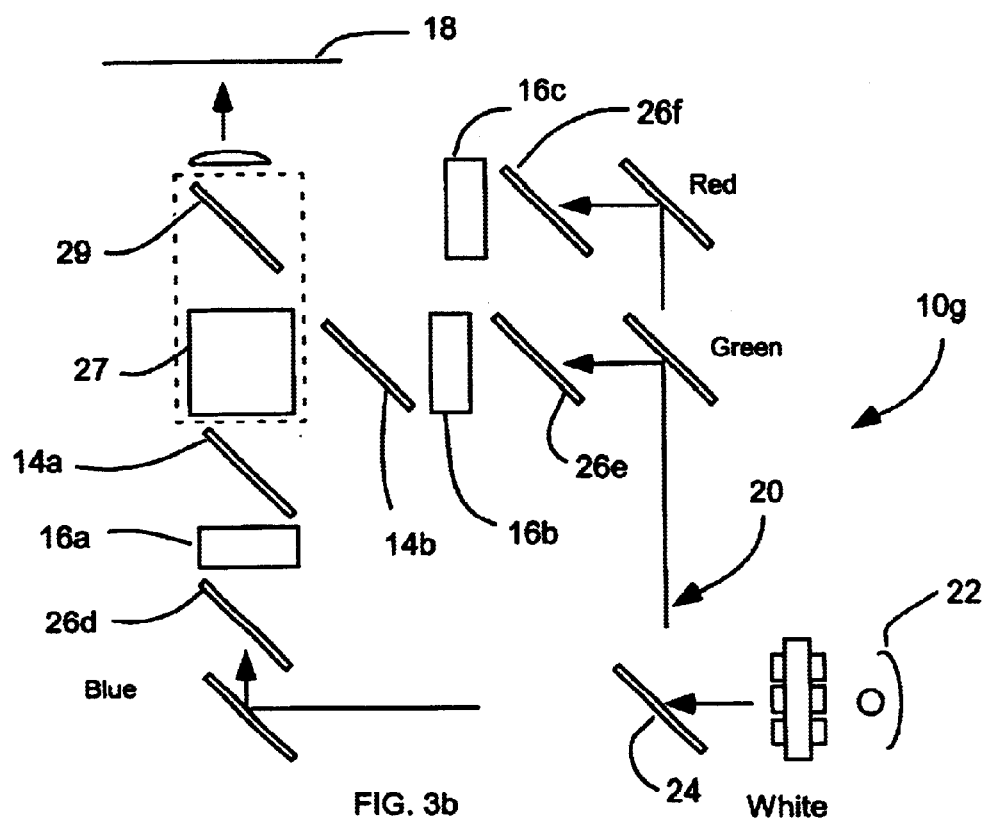
FIG. 3b is a schematic view of another image projection system in accordance with an embodiment of the present invention.

The wire grid polarizers can be oriented to other optical elements to recycle the light. Referring to FIG. 4c, an exemplary system 10j is shown with a light recycling apparatus 13. The apparatus 13 can include a plurality of mirrors or the like to collect the discarded light beams of discarded polarizations. The apparatus 13 can also direct the discarded light beams back to the light source or separator. While the apparatus 13 is shown in FIG. 4c for a single optical path, it will be appreciated that the apparatus can be configured to collect the discarded light beams from the various different optical paths. In addition, the system 10j is shown with a single WGP-PBS 16e as a pre-polarizer, and a single WGP-PBS 28 as an analyzer. Such a configuration can be used with a single color light beam. Alternatively, an alternator 24b or color wheel can be used, as described above, to rapidly alternate between different colors of light.

As described above, the WGP-PBSs can be used as the pre-polarizers 26a–c, the polarizing beam splitters or analyzers 14a–c, and the combiner(s).

For adequate optical efficiency, the WGP-PBS should have high reflectivity ($R_S$) of the desired polarization from the light source 20, and it should have high transmissivity ($T_P$) of the opposite polarization from the liquid crystals array 26. The conversion efficiency is proportional to the product of these two, $R_S T_P$, so deficiency in one factor can be compensated to some extent by improvement in the other.

Examples of wire grid polarizing beam splitters 14 of the present invention advantageously show the following characteristics which demonstrate the advantage of using a WGP-PBS of the present invention as the pre-polarizer, the analyzer, and/or the combiner in display devices for the visible portion of the spectrum. Theoretical calculations of further improvements indicate that even better polarizing beam splitters will be available.

Figure 5A:
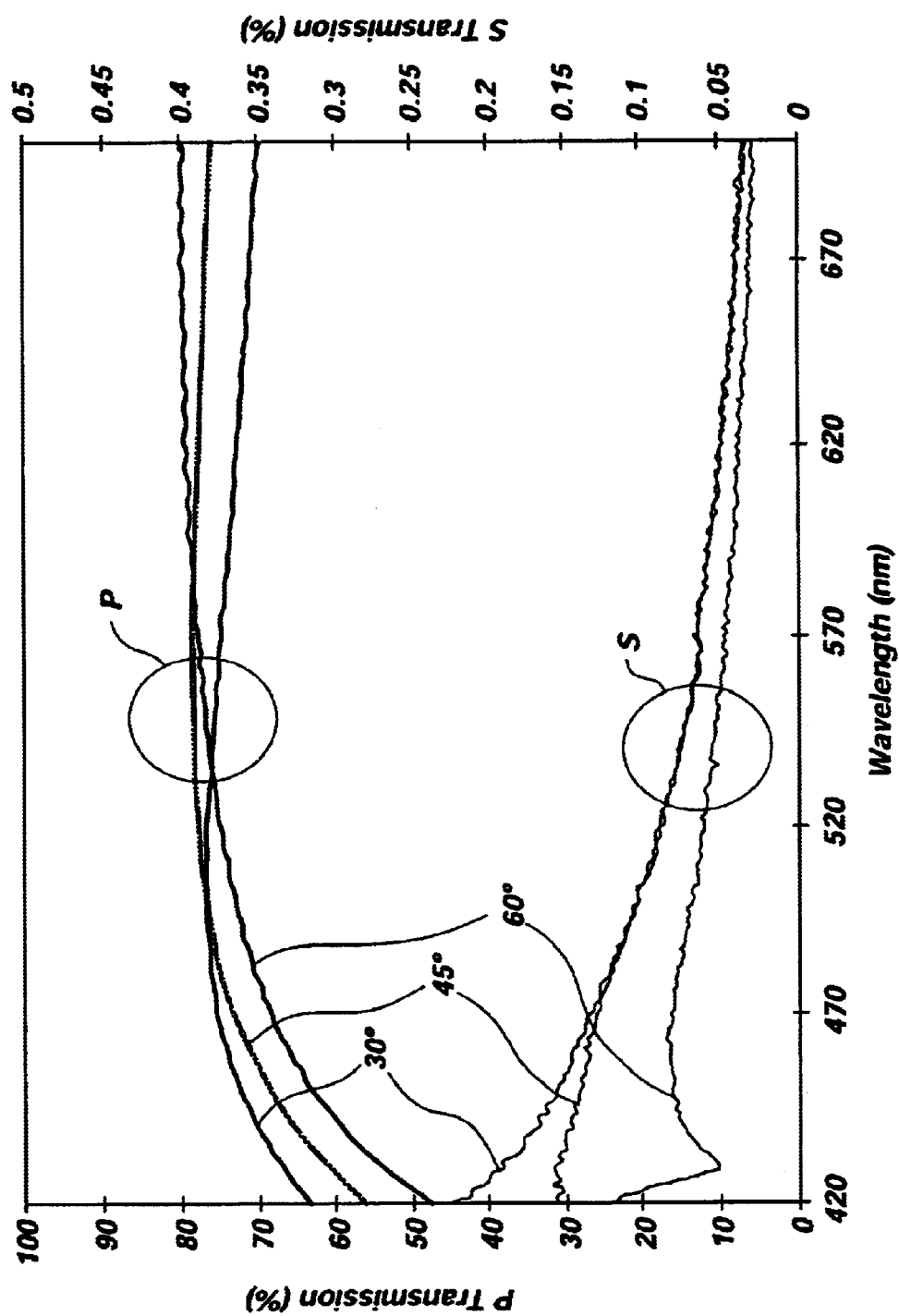
FIG. 5a is a graphical plot showing the relationship between wavelength and transmittance for both S and P polarizations of a preferred embodiment of the wire grid polarizing beam splitter of the present invention.
Figure 5B:
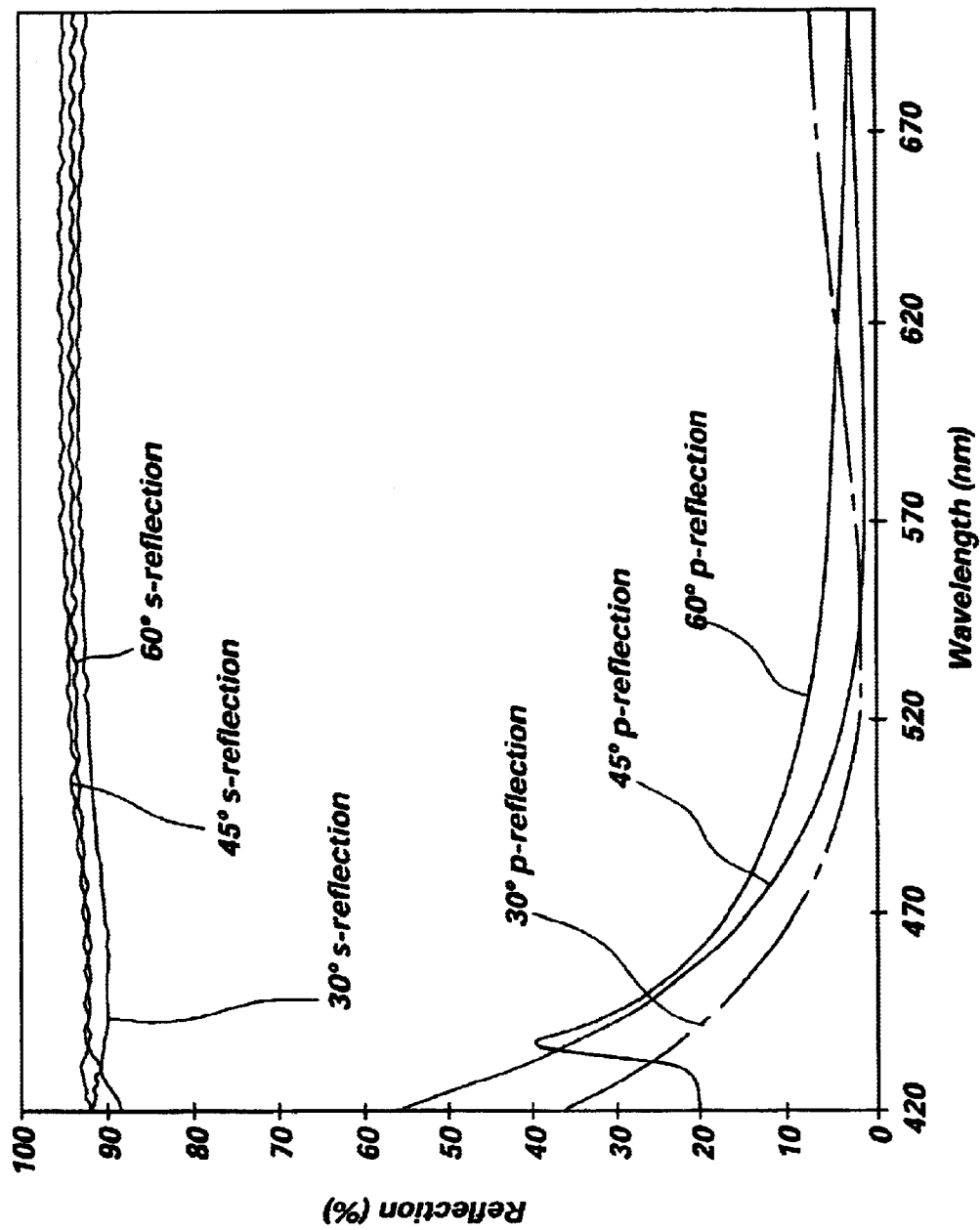
FIG. 5b is a graphical plot showing the relationship between wavelength and reflectance for both S and P polarizations of a preferred embodiment of the wire grid polarizing beam splitter of the present invention.
Figure 5C:
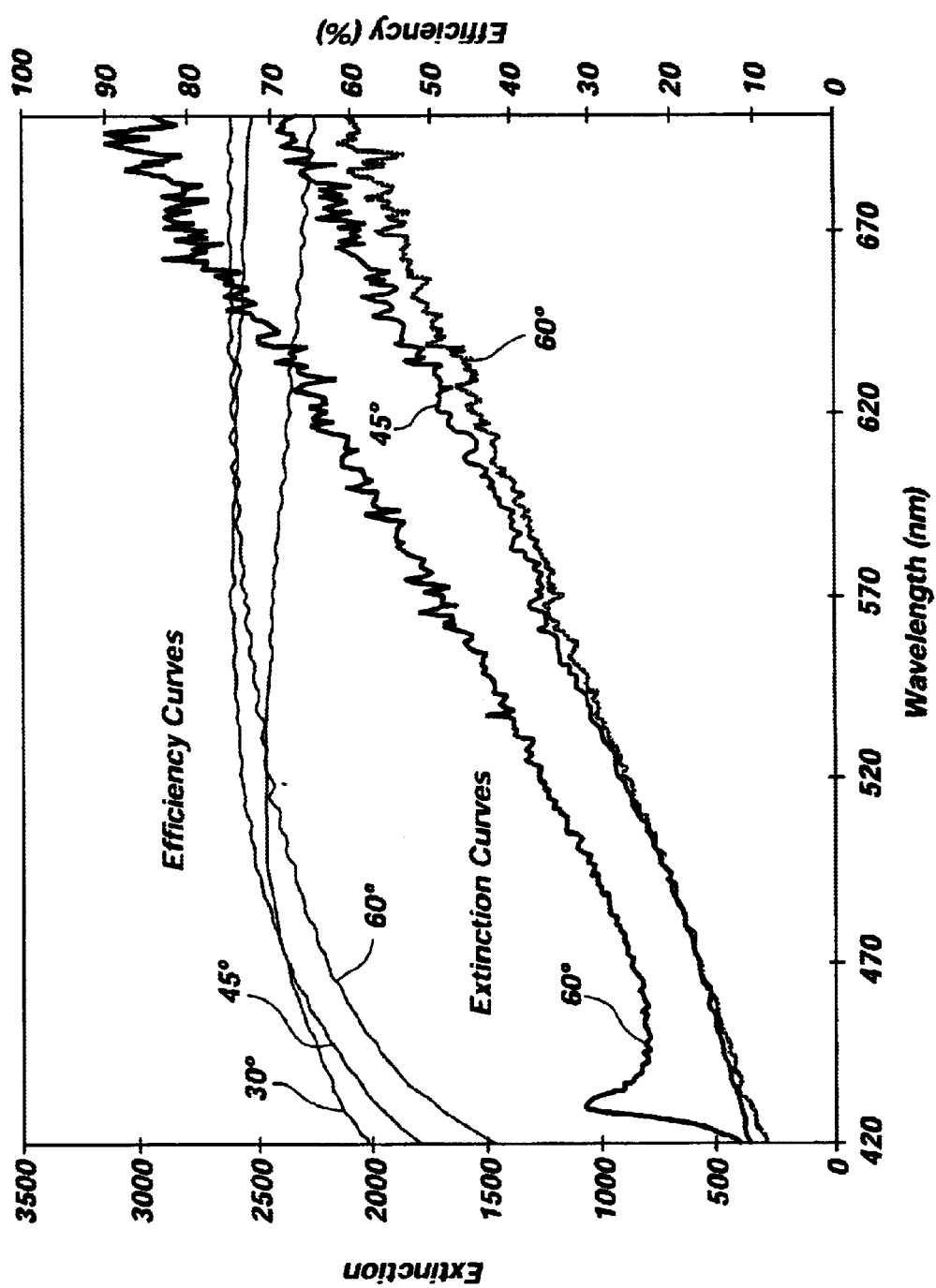
FIG. 5c is a graphical plot showing the relationship between wavelength, efficiency and transmission extinction of a preferred embodiment of the wire grid polarizing beam splitter of the present invention.

Referring to FIGS. 5a and 5b, the measured transmissivity and reflectivity, respectively, for both S and P polarizations of a WGP-PBS are shown. In FIG. 5c, the efficiency of the WGP-PBS is shown as the product of the transmissivity and reflectivity. In addition, the extinction is also shown in FIG. 5c. In FIGS. 5a–c, the WGP-PBS is oriented to reflect the s-polarization and transmit the p-polarization at incident angles of 30 degrees, 45 degrees and 60 degrees. For an image projection system, such as a projector, the product of the reflected s-polarization and transmitted p-polarization ($R_S T_P$) must be large if source light is to be efficiently placed on the screen. On the other hand, for the resolution needed to achieve high information density on the screen, it is important that the converse product ($R_P T_S$) be very small (i.e. the transmission of s-polarized light multiplied by the reflection of p-polarized light must be small). It is clear from the figures that the wire grid polarizing beam splitter of the present invention meets these standards over the entire spectrum without degradation by Rayleigh resonance or other phenomena.

Figure 6:
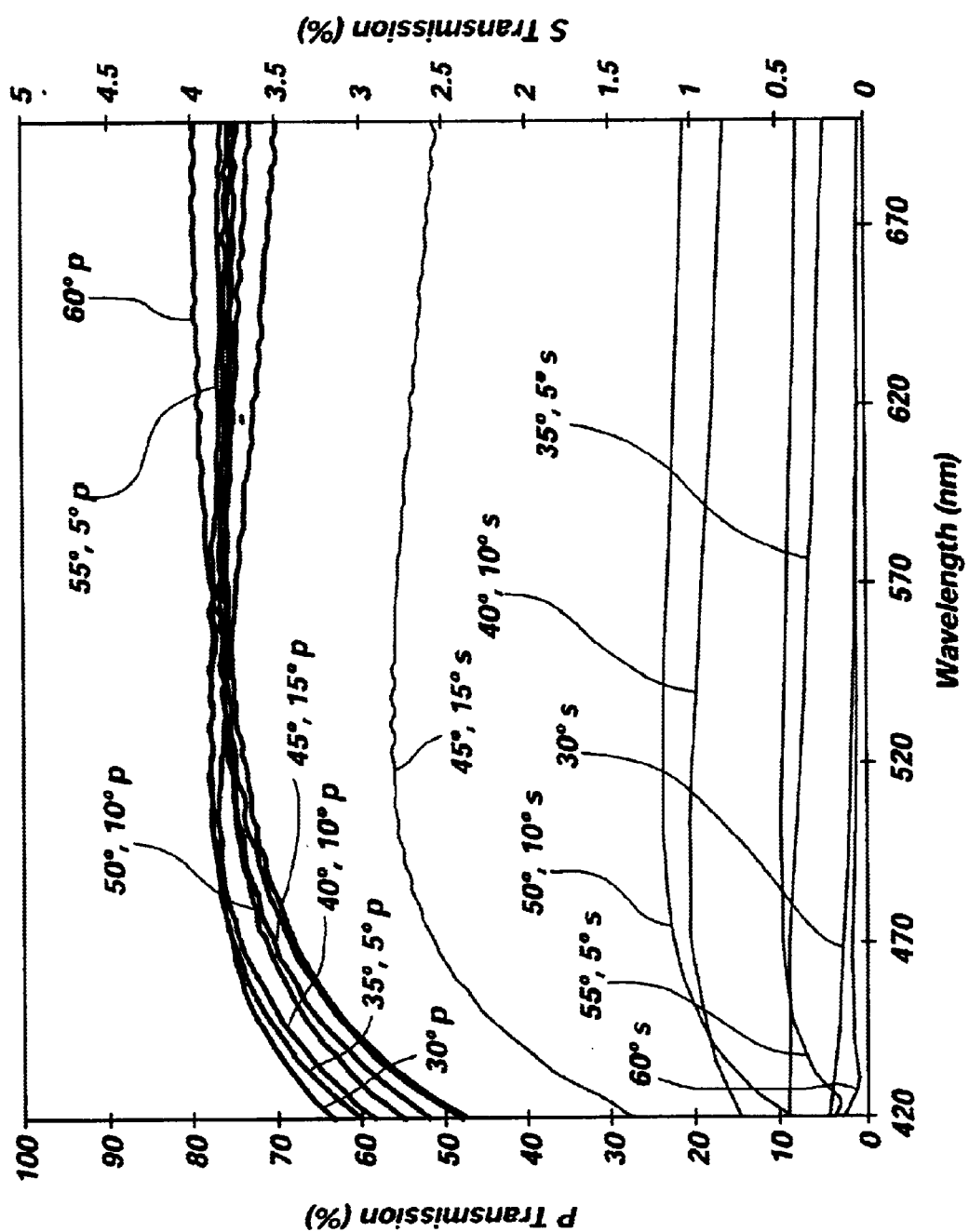
FIG. 6 is a graphical plot showing the performance of the preferred embodiment of the wire grid polarizing beam splitter of the present invention as a function of the incident angle.

Another important feature is a wide acceptance angle. This must be large if light gathering from the source, and hence the conversion efficiency, is maximized. Referring to FIG. 6, the performance of the wire grid polarizing beam splitter of the present invention is shown for various portions of the light cone centered around the optical axis which is inclined at 45 degrees. In FIG. 6, the first referenced angle is the angle in the plane of incidence while the second referenced angle is the angle in the plane perpendicular to the plane of incidence. It is clear that the WGP-PBS of the present invention is able to accept cones of light (either diverging or converging) with half-angles between approximately 12 and 25 degrees.

Figure 4A:
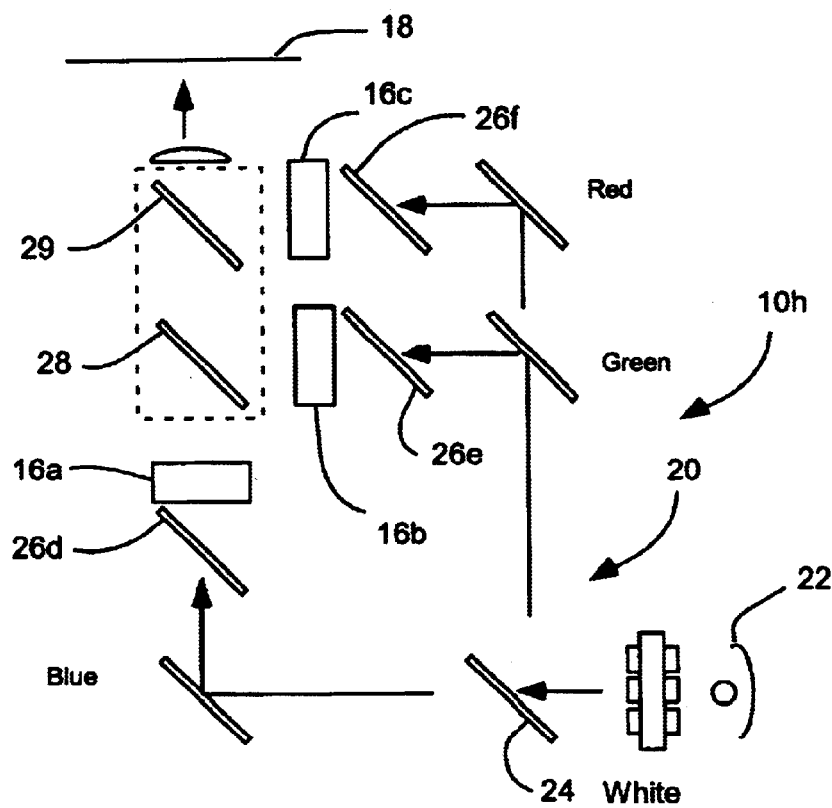
FIG. 4a is a schematic view of another image projection system in accordance with an embodiment of the present invention.
Figure 4B:
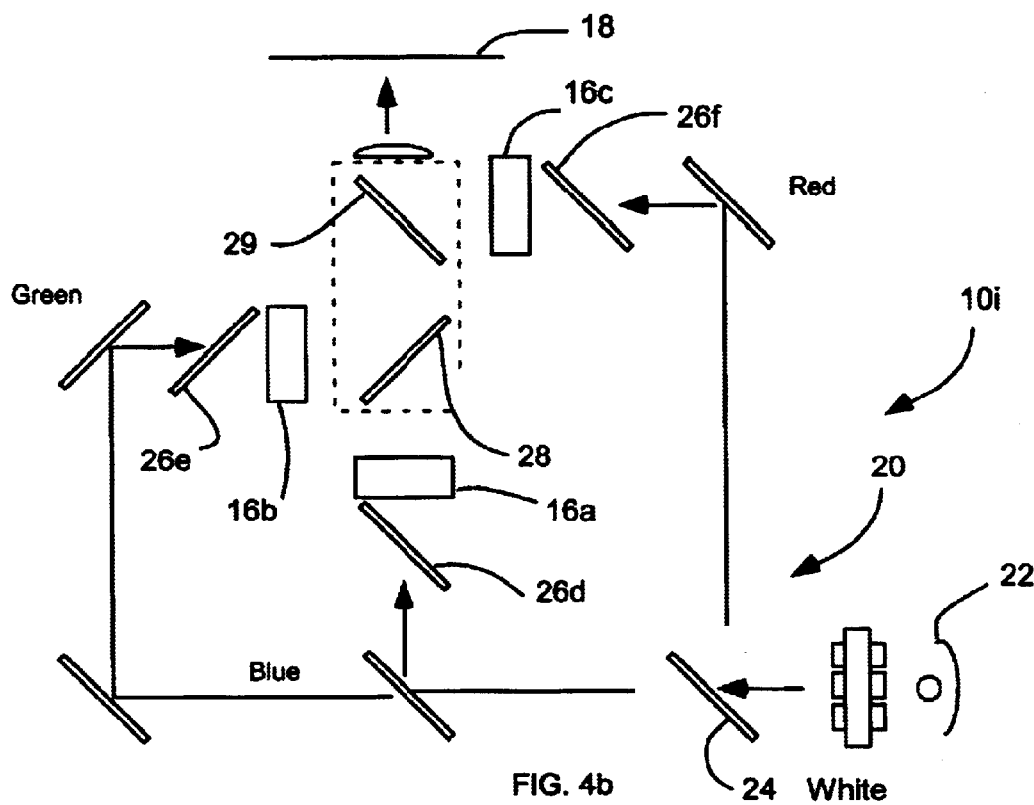
FIG. 4b is a schematic view of another image projection system in accordance with an embodiment of the present invention.
Figure 7A:
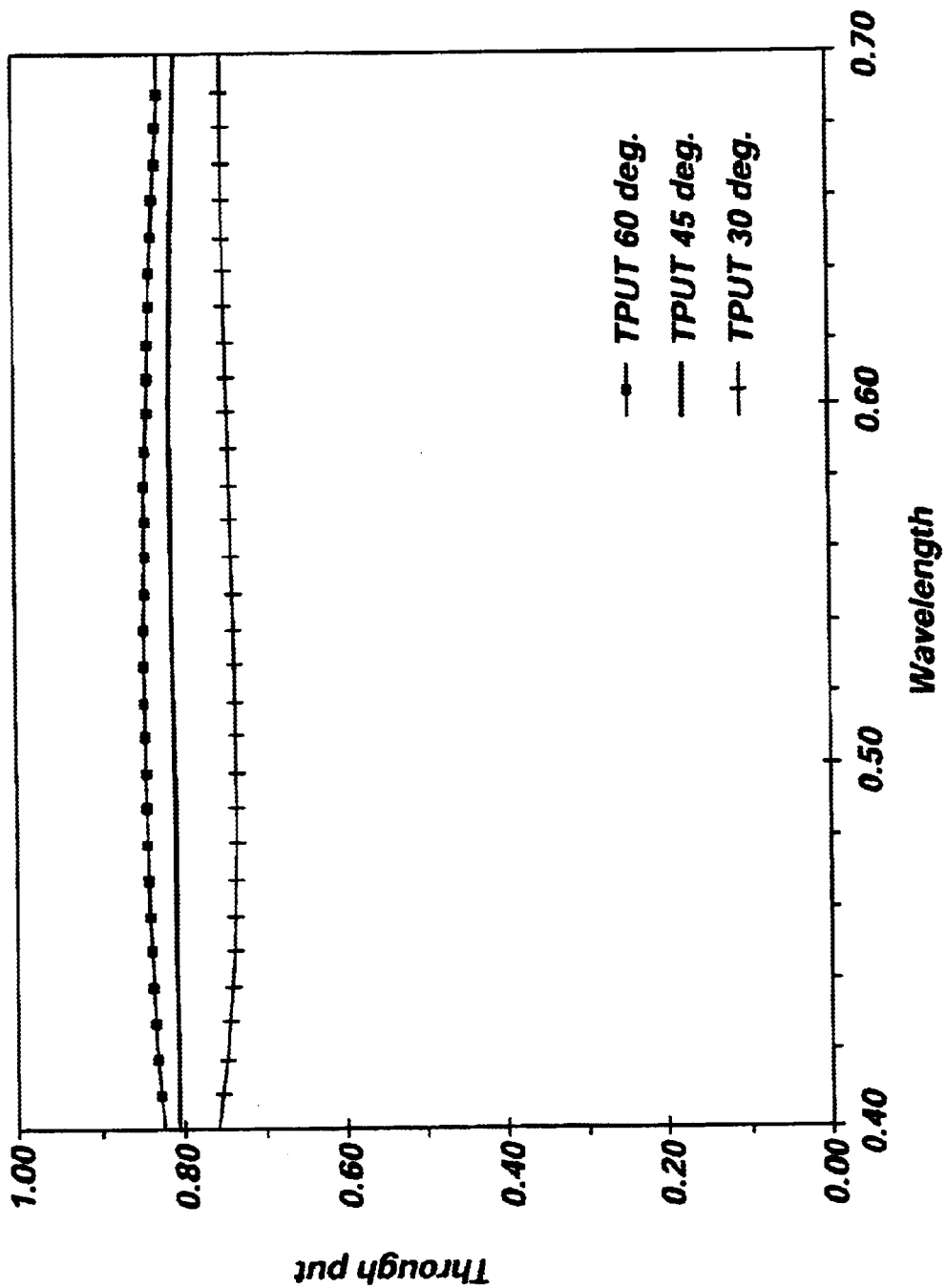
FIG. 7a is a graphical plot showing the theoretical throughput performance of an alternative embodiment of the wire grid polarizing beam splitter of the present invention.
Figure 7B:
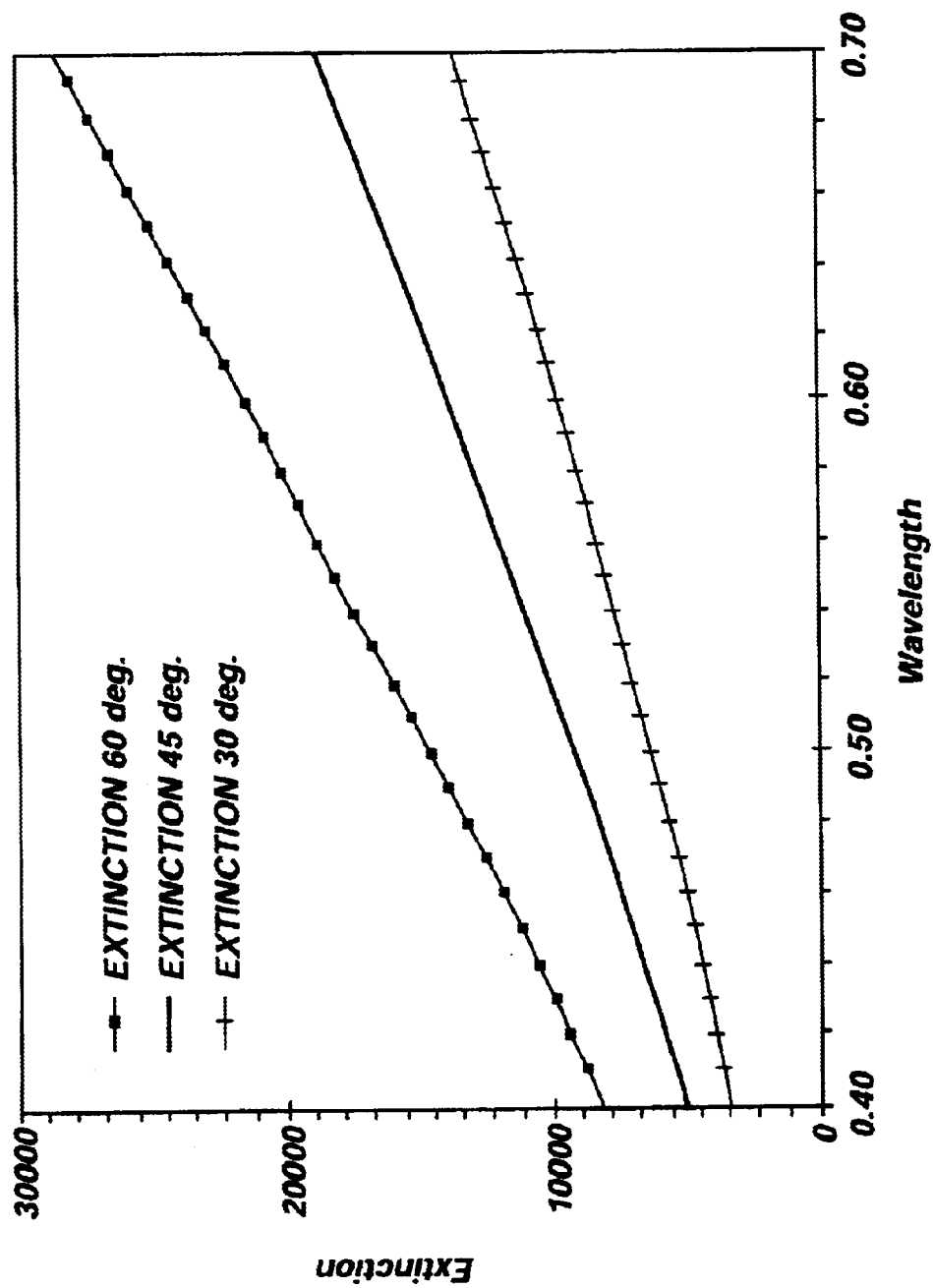
FIG. 7b is a graphical plot showing the theoretical extinction performance of an alternative embodiment of the wire grid polarizing beam splitter of the present invention.
Figure 7C:
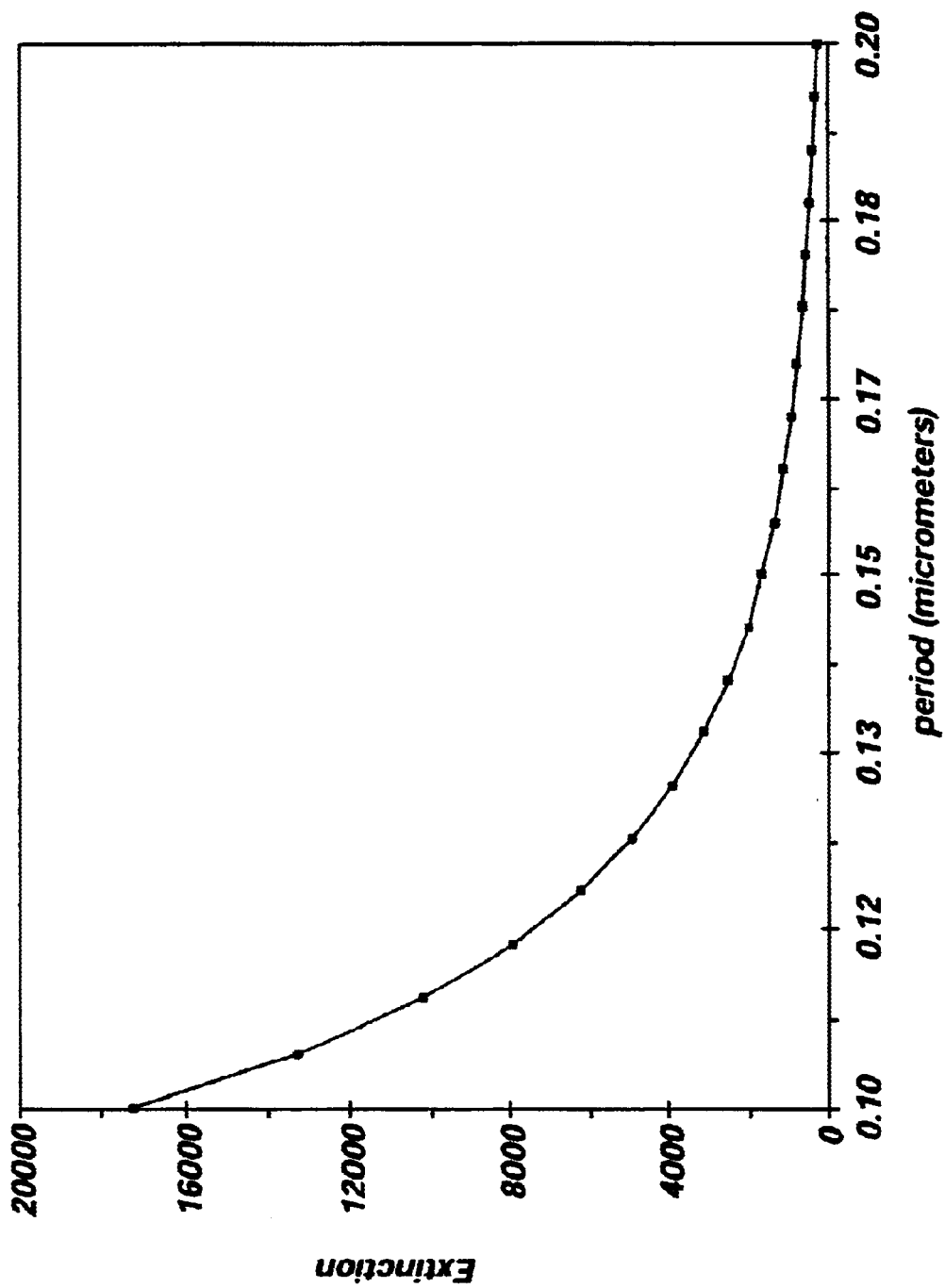
FIG. 7c is a graphical plot showing the theoretical extinction performance of an alternative embodiment of the wire grid polarizing beam splitter of the present invention.

Referring to FIGS. 7a–c, theoretical calculations for an alternative embodiment of a wire grid polarizing beam splitter indicate that significantly larger light cones and/or other enhancements will be possible. FIGS. 4a and 4b show the theoretical throughput and extinction, respectively, of a wire grid polarizing beam splitter with a period p reduced to 130 nm. In addition, the grid height or thickness is 130 nm; the line-spacing ratio is 0.48; the substrate groove depth is 50 nm; and the substrate is BK7 glass. It should be noted in FIG. 7a that the throughput is grouped much more closely than the throughput shown in FIG. 5c. Therefore, performance can be improved by reducing the period p. It should be noted in FIG. 7b that the extinction is significantly increased in comparison to FIG. 5c.

FIG. 7c shows the theoretical extinction of another alternative embodiment of the wire grid polarizing beam splitter with the period p further reduced. The wavelength is 420 nm and the incidence angle is 30 degrees. It should be noted that the extinction increases markedly as the period p is reduced.

As indicated above, an important consequence of the ability to accept larger light cones with a WGP-PBS that will work well at large angles is that the PBS no longer restricts the optical design of the imaging system. Thus, conventional light sources can be used, with the advantage of their low cost, cooler operation, small size, and low weight. The wide range of angles over which the WGP-PBS works well makes it possible for the designer to position the other optical elements in favorable positions to improve the size and operation of the display.

Referring to FIGS. 1–4, the design flexibility provided by the WGP-PBSs is demonstrated. In addition, the WGP-PBSs provide wide range of angles, also contributing to design flexibility.

Yet other features of wire grids provide advantages for display units. The conventional technology requires the use of a glass cube. This cube imposes certain requirements and penalties on the system. The requirements imposed include the need to deal with thermal loading of this large piece of glass, the need for high quality materials without stress birefringence, etc., which impose additional cost, and the extra weight and bulk of the cube itself. The WGP-PBS of the present invention advantageously is a divided or patterned thin film that does not occupy much volume and does not weigh very much. It can even be integrated with or incorporated into other optical elements such as color filters, to further reduce part count, weight, and volume of the projection system.

The WGP-PBS of the present invention is also very robust. Modem light sources generate very high thermal gradients in the polarizer immediately after the light is switched on. At best, this can induce thermal and stress birefringence which causes cross talk between polarizations. At worst, it can delaminate multilayer polarizers or cause the cemented interface in a cube beam splitter to separate. What is more, the long duration of exposure to intense light causes some materials to change properties (typically yellowing from photo-oxidation). However, wire grid polarizing beam splitters are made of chemically inert metal that is well attached to glass or other substrate materials. They have been shown to withstand high temperatures as well as long periods of intense radiation from light sources.

The WGP-PBS of the present invention also is easy to align. It is a single part that needs to be adjusted to direct the source beam onto the liquid crystal array. This is the same simple procedure that would be used for a flat mirror. There is another adjustment parameter, namely, the angular rotation about the normal to the WGP surface. This determines the orientation of polarization in the light beam. This adjustment is not critical because the WGP functions as its own analyzer and cannot be out of alignment in this sense. If there are other polarizing elements in the optical train, the WGP-PBS should be oriented with respect to their polarization, but slight misalignment is not critical because: according to Malus' law, angular variation makes very little difference in the intensity transmitted by polarizers if their polarization axes are close to being parallel (or perpendicular).

In order to be competitive with conventional polarizers, the product $R_S T_P$ must be above approximately 50%. This represents a lower estimate which would only be practical if the WGP-PBS was able to gather significantly more light from the light source than the conventional polarizing beam splitters. The estimate of 50% comes from an assumption that the best conventional beam splitter, a modern MacNeille cube beam splitter, can deliver an f/# of about f/2.5 at best. An optical system which was twice as fast, or capable of gathering twice as much light, would then have an f/# of ½ of this value, or about f/1.8, which is certainly a reasonable f/# in optical image projection systems. A system which is twice as fast, and therefore capable of gathering twice the light from the source, would approximately compensate for the factor of 2 decrease in the $R_S T_P$ product over the conventional cube beam splitter, resulting in an equivalent projection system performance. In fact, since a WGP-PBS can potentially be used down below f/1.2 (a factor of four increase) this seemingly low limit can still produce very bright images. Of course, an $R_S T_P$ product which is over this minimum value will provide even better performance.

Another important performance factor is contrast in the image, as defined by the ratio of intensities of light to dark pixels. One of the significant advantages of the WGP-PBS is the improved contrast over compound incident angles in comparison to the prior art cube beam splitter such as a McNeille prism. The physics of the McNeille prism polarizes light by taking advantage of the difference in reflectivity of S vs. P polarization at certain angles. Because S and P polarization are defined with respect to the plane of incidence, the effective S and P polarization for a particular ray in a cone of light rotates with respect to the ray along the optical axis as various rays within the cone of light are considered. The consequence of this behavior is the well-known compound angle problem in which the extinction of the polarizer is significantly reduced for certain ranges of angles within the cone of light passing through the polarizing beam splitter, significantly reducing the average contrast over the cone.

The WGP-PBS, on the other hand, employs a different physical mechanism to accomplish the polarization of light which largely avoids this problem. This difference in behavior is due to the fact that the polarization is caused by the wire grids in the beam splitter which have the same orientation in space regardless of the plane of incidence for any particular ray in the cone of light. Therefore, even though the plane of incidence for any particular ray is the same when incident on a McNeille prism or a WGP, the polarization effect is only dependent on the plane of incidence in the case of the McNeille prism, meaning the compound angle performance of the WGP is much improved over that provided by the cube beam splitter.

The fact that the function of the WGP-PBS is independent of the plane of incidence means that the WGP-PBS can actually be used with the wires or elements oriented in any direction. The preferred embodiment of the invention has the elements oriented parallel to the axis around which the polarizer is tilted so that the light strikes the WGP-PBS at an angle. This particular orientation is preferred because it causes the polarization effects of the surface reflections from the substrate to be additive to the polarization effects from the grid. It is possible, however, to produce a WGP-PBS which functions to reflect the P-polarization and transmit the S-polarization (which is exactly opposite what has been generally described herein) over certain ranges of incident angles by rotating the grid elements so they are perpendicular to the tilt axis of the WGP-PBS. Similarly, the grid elements can be placed at an arbitrary angle to the tilt axis to obtain a WGP-PBS which functions to transmit and reflect light with polarizations aligned with the projection of this arbitrary angle onto the wavefront in the light beam. It is therefore clear that WGP-PBS which reflect the P-polarization and transmit the S-polarization, or which reflect and transmit light with polarization oriented at arbitrary angles are included within this invention.

The compound angle performance advantage of the WGP-PBS provides an inherently more uniform contrast over the entire light cone, and is one of the reasons the WGP is suitable for very small f-numbers. But, of course, it is not the only factor affecting the image contrast. The image contrast is governed to a large extent by low leakage of the undesired polarization, but in this case the product $T_S R_P$ is not the important parameter, because the image generating array which lies in sequence after the first encounter with the beam splitter but before the second also takes part in the production of the image contrast. Therefore, the final system contrast will depend on the light valve performance as well as the polarizer extinction. However, lower bounds on the required beam splitter performance can be determined with the assumption that the light valve performance is sufficient enough that it can be assumed to have an essentially infinite contrast. In this case, the system contrast will depend entirely on the beam splitter performance.

Referring to FIGS. 1–4c, there are several different functions fulfilled by the WGP-PBS, such as a pre-polarizer, analyzer or beam splitter, and/or combiner. In addition, some of the WGP-PBSs fulfill two different functions, such as both the combiner and the analyzer or beam splitter. One function is the preparation of the polarized light before it strikes the transmissive array 16a–c or other suitable image generation device. The requirement here is that the light be sufficiently well polarized that any variations in the polarization of the light beam created by the light valve can be adequately detected or analyzed such that the final image will meet the desired level of performance. Similarly, the analyzer or beam splitter 14a–c must have sufficient performance to analyze light which is directed by the light valve or transmissive array to the beam splitter so that the desired system contrast performance is achieved. In addition, the combiner must have sufficient performance to both transmit and reflect the light to combine the different colors.

These lower bounds can be determined fairly easily. For reasons of utility and image quality, it is doubtful that an image with a contrast of less than 10:1 (bright pixel to adjacent dark pixel) would have much utility. Such a display would not be useful for dense text, for example. If a minimum display system contrast of 10:1 is assumed, then an incident beam of light is required which has at least 10 times the light of the desired polarization state over that of the undesired polarization state. In terms of polarizer performance, this would be described as having an extinction of 10:1 or of simply 10.

As an analyzer, the beam splitter 14 must analyze the image, and must be able to pass the light of the right polarization state, while eliminating most of the light of the undesired state. Again, assuming from above a light beam with an image encoded in the polarization state, and that this light beam has the 10:1 ratio assumed, then a beam splitter is desired which preserves this 10:1 ratio to meet the goal of a system contrast of 10:1. In other words, it is desired to reduce the light of the undesired polarization by a factor of 10 over that of the right polarization. This again leads to a minimum extinction performance of 10:1 for the analysis function of the beam splitter.

Clearly, higher system contrast will occur if either or both of the polarizer and analyzer functions of the beam splitter have a higher extinction performance. It is also clear that it is not required that the performance in both the analyzer function and the polarizer function of the beam splitter be matched for an image projection system to perform adequately. An upper bound on the polarizer and analyzer performance of the beam splitter is more difficult to determine, but it is clear that extinctions in excess of approximately 20,000 are not needed in this application. A good quality movie projection system as found in a quality theater does not typically have an image contrast over about 1000, and it is doubtful that the human eye can reliably discriminate between an image with a contrast in the range of several thousand and one with a contrast over 10,000. Given a need to produce an image with a contrast of several thousand, and assuming that the light valves capable of this feat exist, an upper bound on the beam splitter extinction in the range of 10,000–20,000 would be sufficient.

The above delineation of the minimum and maximum bounds on the wire grid beam splitter is instructive, but as is clear from the demonstrated and theoretical performance of a wire grid beam splitter as shown above, much better than this can be achieved. In accordance with this information, the image projection system can have a $R_S T_P$ of 65%, and $R_P$ or $T_S$ or both are 67%, as shown in FIGS. 5a–c.

A post-polarizer or clean-up polarizer can be disposed in the modulated beam, or between the WGP-PBS 14 and the screen 18. The image display system may also utilize light gathering optics and projection optics. LCD compensation films 17 can be disposed on either side of the transmissive array 16.

Figure 8:
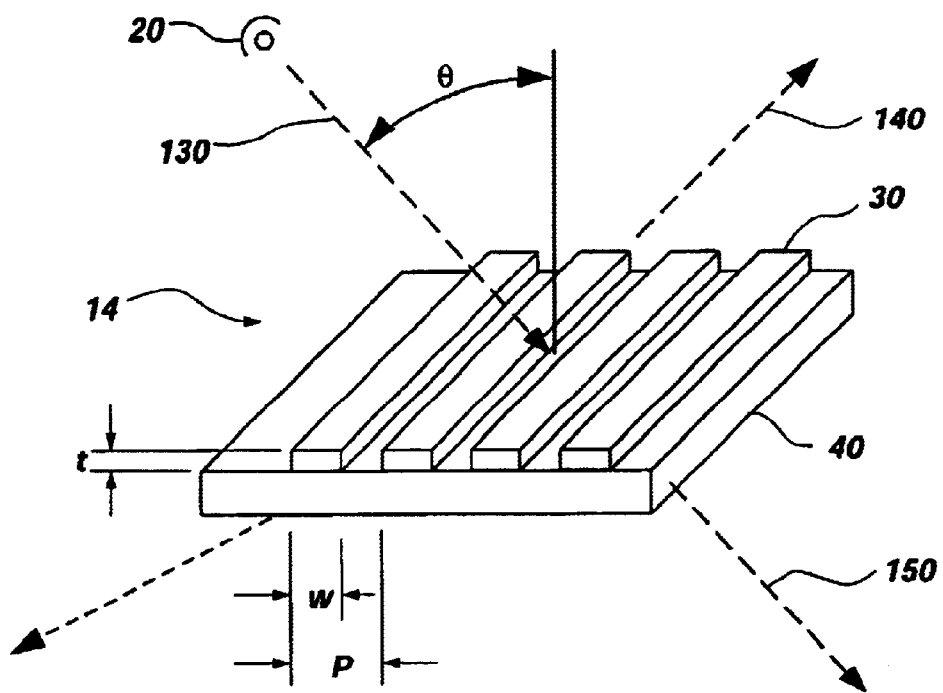
FIG. 8 is a perspective view of the wire grid polarizing beam splitter of the present invention.
Figure 9:
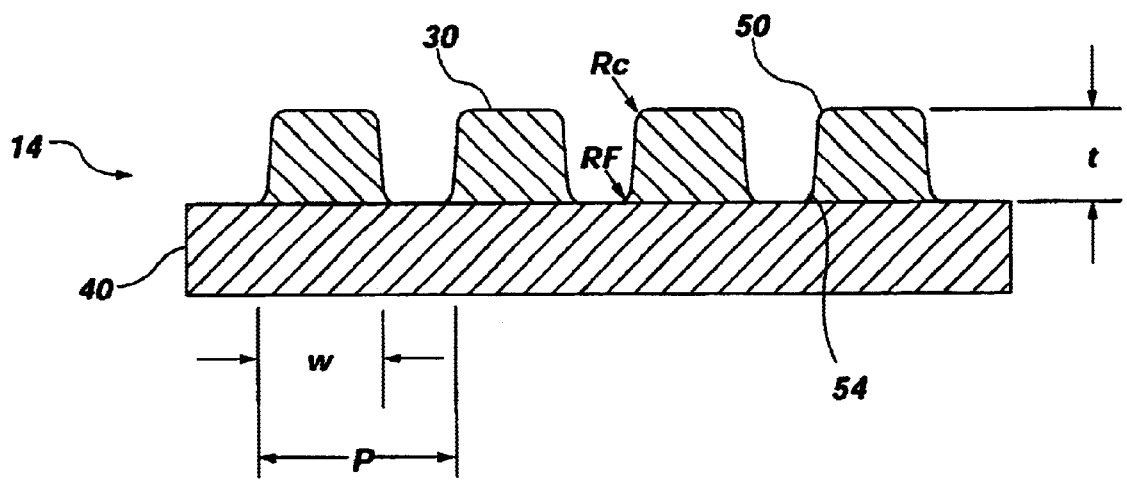
FIG. 9 is a cross sectional side view of the wire grid polarizing beam splitter of the present invention.

Referring to FIGS. 8 and 9, the wire grid polarizing beam splitter 14 of the present invention is shown in greater detail. The polarizing beam splitter is further discussed in greater detail in U.S. Pat. No. 6,243,199, issued Jun. 5, 2001, which is herein incorporated by reference.

The polarizing beam splitter 14 has a grid 30, or an array of parallel, conductive elements, disposed on a substrate 40. The source light beam 130 produced by the light source 20 is incident on the polarizing beam splitter 14 with the optical axis at an angle Θ from normal, with the plane of incidence preferably orthogonal to the conductive elements. An alternative embodiment would place the plane of incidence at an angle Θ to the plane of conductive elements, with Θ approximately 45 degrees. Still another alternative embodiment would place the plane of incidence parallel to the conductive elements. The polarizing beam splitter 14 divides this beam 130 into a specularly reflected component 140, and a transmitted component 150. Using the standard definitions for S and P polarization, the light with S polarization has the polarization vector orthogonal to the plane of incidence, and thus parallel to the conductive elements. Conversely, light with P polarization has the polarization vector parallel to the plane of incidence and thus orthogonal to the conductive elements.

Ideally, the polarizing beam splitter 14 will function as a perfect mirror for the S polarized light, and will be perfectly transparent for the P polarized light. In practice, however, even the most reflective metals used as mirrors absorb some fraction of the incident light, and thus the WGP will reflect only 90% to 95%, and plain glass does not transmit 100% of the incident light due to surface reflections.

The physical parameters of the wire grid beam splitter 14 which should be optimized as a group in order to achieve the level of performance required include: the period p of the wire grid 30, the height or thickness t of the grid elements 30, the width w of the grids elements 30, and the slope of the grid elements sides. It will be noted in examining FIG. 9 that the general cross-section of the grid elements 30 is trapezoidal or rectangular in nature. This general shape is also a necessary feature of the polarizing beam splitter 14 of the preferred embodiment, but allowance is made for the natural small variations due to manufacturing processes, such as the rounding of corners 50, and fillets 54, at the base of the grid elements 30.

It should also be noted that the period p of the wire grid 30 must be regular in order to achieve the specular reflection performance required to meet the imaging fidelity requirements of the beam splitter 14. While it is obviously better to have the grid 30 completely regular and uniform, some applications may have relaxed requirements in which this is not as critical. However, it is believed that a variation in period p of less than 10% across a meaningful dimension in the image (such as the size of a single character in a textual display, or a few pixels in an image) is required to achieve the necessary performance.

Similarly, reasonable variations across the beam splitter 14 in the other parameters described, such as the width w of the grid elements 30, the grid element height t, the slopes of the sides, or even the corner rounding 50, and the fillets 54, are also possible without materially affecting the display performance, especially if the beam splitter 14 is not at an image plane in the optical system, as will often be the case. These variations may even be visible in the finished beam splitter 14 as fringes, variations in transmission efficiency, reflection efficiency, color uniformity, etc. and still provide a useful part for specific applications in the projection imaging system.

The design goal which must be met by the optimization of these parameters is to produce the best efficiency or throughput possible, while meeting the contrast requirements of the application. As stated above, the minimum practical extinction required of the polarizing beam splitter 14 is on the order of 10. It has been found that the minimum required throughput ($R_S T_P$) of the beam splitter 14 in order to have a valuable product is approximately 50%, which means either or both of $R_P$ and $T_S$ must be above about 67%. Of course, higher performance in both the throughput and the extinction of the beam splitter will be of value and provide a better product. In order to understand how these parameters affect the performance of the wire grid beam splitter, it is necessary to examine the variation in performance produced by each parameter for an incident angle of 45 degrees, and probably other angles of interest.

The performance of the wire grid beam splitter 14 is a function of the period p. The period p of the wire grid elements 30 must fall under approximately 0.21 μm to produce a beam splitter 14 which has reasonable performance throughout the visible spectrum, though it would be obvious to those skilled in the art that a larger period beam splitter would be useful in systems which are expected to display less than the full visible spectrum, such as just red, red and green, etc.

The performance of the wire grid beam splitter 14 is a function of the element height or thickness t. The wire-grid height t must be between about 0.04 and 0.5 μm in order to provide the required performance.

The performance of the wire grid beam splitter 14 is a function of the width to period ratio (w/p) of the elements 30. The width w of the grid element 30 with respect to the period p must fall within the ranges of approximately 0.3 to 0.76 in order to provide the required performance.

The performance of the wire grid beam splitter 14 is a function of the slopes of the sides of the elements 30. The slopes of the sides of the grid elements 30 preferably are greater than 68 degrees from horizontal in order to provide the required performance.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. An image projection system, for providing a bright and clear image, the system comprising:
   a) a light source capable of producing a visible light beam;
   b) at least one first polarizer, located near the light source in the visible light beam, configured to polarize the light beam into a polarized light beam;
   c) at least one transmissive array, located near the first polarizer in the polarized light beam, capable of modulating the polarization of the polarized light beam by selectively altering the polarization of the polarized light beam to encode image information thereon and creating a modulated beam;
   d) at least one polarizing beam splitter, located near the transmissive array in the modulated beam, and including:
      1) a transparent substrate having a first surface located in the modulated beam, and
      2) a generally parallel arrangement of thin, elongated elements, supported by the substrate, the arrangement being configured and the elements being sized to interact with electromagnetic waves of the modulated beam to generally (i) transmit light through the elements which has a polarization oriented perpendicular to a plane that includes at least one of the elements and the direction of the incident light beam, defining a transmitted beam, and (ii) reflect light from the elements which has a polarization oriented parallel with the plane that includes at least one of the elements and the direction of the incident light beam, defining a reflected beam; and
   e) the polarizing beam splitter being oriented at an angle with respect to the modulated beam such that the modulated beam strikes the first surface of the transparent substrate at an angle and the reflected beam is directed away from the transmissive array; and
   f) a screen, located in either the reflected beam or the transmitted beam, for displaying the encoded image information.

2. A system in accordance with claim 1, wherein:
   a) the first polarizer further includes a first polarizing beam splitter, located in the light beam, the first beam splitter comprising:
      1) a transparent substrate having a first surface located in the light beam, and
      2) a generally parallel arrangement of thin, elongated elements supported by the substrate, the arrangement being configured and the elements being sized to interact with electromagnetic waves of the light beam to generally (i) transmit light through the elements which has a polarization oriented perpendicular to a plane that includes at least one of the elements and the direction of the incident light beam, defining a first polarized transmitted beam, and (ii) reflect light from the elements which has a polarization oriented parallel with the plane that includes at least one of the elements and the direction of the incident light beam, defining a first polarized reflected beam; and
   b) the transmissive array being located in either the first polarized reflected beam or the first polarized transmitted beam.

3. A system in accordance with claim 1, wherein the polarizing beam splitter is oriented with respect to the modulated beam at an incident angle between approximately 0 to 80 degrees.

4. A system in accordance with claim 1, wherein the polarizing beam splitter is oriented with respect to the modulated beam at incidence angles greater than 47 degrees or less than 43 degrees.

5. A system in accordance with claim 1, wherein the light beam has a useful divergent cone with a half angle between approximately 12 and 25 degrees.

6. A system in accordance with claim 1, wherein the polarizing beam splitter is used at an F-number less than approximately f/2.5.

7. A system in accordance with claim 1, wherein the polarizing beam splitter has a throughput of at least 50% defined by the product of the fractional amount of p-polarization transmitted light and the fractional amount of s-polarization reflected light; and wherein the s-polarization transmitted light and p-polarization reflected light are both less than 5%.

8. A system in accordance with claim 1, wherein the polarizing beam splitter has a throughput of at least 50% defined by the product of the fractional amount of s-polarization transmitted light and the fractional amount of p-polarization reflected light; and wherein the p-polarization transmitted light and s-polarization reflected light are both less than 5%.

9. A system in accordance with claim 1, wherein the polarizing beam splitter has a throughput for the light beam of at least 65%, defined by the product of the fractional amount of reflected light and the fractional amount of transmitted light; and wherein the percent of reflected light or the percent of transmitted light is greater than approximately 67%.

10. A system in accordance with claim 1, wherein:
    the arrangement of elements has a period less than approximately 0.21 microns,
    the elements have a thickness between approximately 0.04 to 0.5 microns, and
    the elements have a width of between approximately 30 to 76% of the period.

11. A device in accordance with claim 1, wherein the polarizing beam splitter further includes:
    a) a second layer, separate from the transparent substrate, having a refractive index, the elements being disposed between the transparent substrate and the second layer; and
    b) a plurality of gaps, formed between the elements, and having a content providing a refractive index less than a refractive index of the transparent substrate.

12. A device in accordance with claim 11, wherein the content of the gaps between the elements include air.

13. A system in accordance with claim 11, wherein the content of the gaps between the elements have a vacuum.

14. A system in accordance with claim 11, wherein the content of the gaps between the elements include a material different from materials of the transparent substrate and the second layer.

15. A system in accordance with claim 11, wherein the content of the gaps include a material that is a same material as the second layer.

16. A system in accordance with claim 11, wherein the content of the gaps include a material that is a same material as the first transparent substrate.

17. A system in accordance with claim 11, wherein the content of the gaps between the elements include water.

18. A system in accordance with claim 11, wherein the content of the gaps between the elements include magnesium fluoride.

19. A system in accordance with claim 11, wherein the content of the gaps between the elements include oil.

20. A system in accordance with claim 11, wherein the content of the gaps between the elements include hydrocarbon compounds.

21. A system in accordance with claim 11, wherein the content of the gaps between the elements include plastic.

22. A system in accordance with claim 11, wherein the content of the gaps between the elements include floranated hydrocarbon.

23. A system in accordance with claim 1, wherein the arrangement has a configuration and the elements have a size which would normally create a resonance effect in combination with one of the layers within the visible spectrum; and wherein content of the gaps with a lower refractive index than the refractive index of one of the layers causes a shift of the normally occurring resonance effect to a lower wavelength, thereby broadening a band of visible wavelengths in which no resonance effect occurs.

24. An image projection system comprising:
   a) a light source capable of producing a visible light beam;
   b) a bandwidth separator, located near the light source in the visible light beam, to separate the visible light beam into a plurality of colored beams of different bandwidths;
   c) at least one first polarizer, located near the light source in the visible light beam, configured to polarize the light beam;
   d) the separator and the at least one first polarizer together producing a plurality of colored polarized beams;
   e) a plurality of transmissive arrays, each disposed in one of the colored polarized beams, each capable of modulating polarization of the respective colored polarized beam by selectively altering the polarization of the colored polarized beam to encode image information thereon and creating a colored modulated beam;
   f) at least one polarizing beam splitter, located in at least two of the colored modulated beams, to both 1) separate the image information encoded on the at least two colored modulated beams, and 2) combine the at least two colored modulated beams into a combined beam, the at least one polarizing beam splitter including:
      1) a transparent substrate having a first surface located in the at least two colored modulated beams, and
      2) a generally parallel arrangement of thin, elongated elements, supported by the substrate, the arrangement being configured and the elements being sized to interact with electromagnetic waves of the colored modulated beams to generally (i) transmit light through the elements which has a polarization oriented perpendicular to a plane that includes at least one of the elements and the direction of the incident light beam, defining a colored transmitted beam, and (ii) reflect light from the elements which has a polarization oriented parallel with the plane that includes at least one of the elements and the direction of the incident light beam, defining a colored reflected beam; and
   g) a screen, located in the combined beam, for displaying the encoded image information.

25. A device in accordance with claim 24, wherein the at least one polarizing beam splitter is oriented at an angle with respect to the at least two colored modulated beams such that each of the colored modulated beams strikes the first surface of the transparent substrate of the at least one polarizing beam splitter at an angle and the colored reflected beam being directed away from the respective transmissive array.

26. A device in accordance with claim 24, wherein the at least one first polarizer includes:
   a) a first transparent substrate having a first surface located in the light beam, and
   b) a generally parallel arrangement of thin, elongated elements supported by the substrate, the arrangement being configured and the elements being sized to interact with electromagnetic waves of the light beam to generally (i) transmit light through the elements which has a polarization oriented perpendicular to a plane that includes at least one of the elements and the direction of the incident light beam, defining a first transmitted beam, and (ii) reflect light from the elements which has a polarization oriented parallel with the plane that includes at least one of the elements and the direction of the incident light beam, defining a first reflected beam.

27. A device in accordance with claim 26, wherein the at least one first polarizer is oriented at an acute angle with respect to the light beam such that the light beam strikes the first surface of the first polarizing beam splitter at an acute angle.

28. An image projection system comprising:
   a) a light source capable of producing a visible light beam;
   b) a bandwidth separator, located near the light source in the visible light beam, to separate the visible light beam into a plurality of colored beams each characterized by a different color with different bandwidths;
   c) at least one first polarizer, located near the light source in the visible light beam, configured to polarize the light beam;
   d) the separator and the at least one first polarizer together producing a plurality of colored polarized beams;
   e) three transmissive arrays, each in one of the colored polarized beams, each capable of modulating polarization of the respective colored polarized beam by selectively altering the polarization of the colored polarized beam to encode image information thereon and creating a colored modulated beam;
   f) a first polarizing beam splitter, located near two transmissive arrays and in two different colored modulated beams, combining the two different colored modulated beams into a first combined beam;
   g) a second polarizing beam splitter, located near another transmissive array and the first polarizing beam splitter, combining a colored modulated beam from the another transmissive array and the first combined beam into a second combined beam;
   h) each of the first and second polarizing beam splitters including:
      1) a transparent substrate having a first surface; and
      2) a generally parallel arrangement of thin, elongated elements, supported by the substrate, the arrangement being configured and the elements being sized to interact with electromagnetic waves of the colored modulated beams to generally (i) transmit light through the elements which has a polarization oriented perpendicular to a plane that includes at least one of the elements and the direction of the incident light beam, and (ii) reflect light from the elements which has a polarization oriented parallel with the plane that includes at least one of the elements and the direction of the incident light beam; and
   i) a screen, located in the second combined beam, for displaying the encoded image information.

29. A system in accordance with claim 28, wherein the first and second polarizing beam splitters are oriented at an angle with respect to the respective colored modulated beams such that each of the colored modulated beams strikes the first surface of the transparent substrate of the respective polarizing beam splitter at an angle and a respective colored reflected beam being directed away from the respective transmissive array.

* * * * *